(12) United States Patent
Schneider

(10) Patent No.: US 12,330,489 B2
(45) Date of Patent: Jun. 17, 2025

(54) COMPACT BLOCK-LIKE ELECTRIC DRIVE WITH AN INVERTER BLOCK AND PARKING LOCK

(71) Applicant: hofer powertrain innovation GmbH, Nürtingen (DE)

(72) Inventor: Severin Schneider, Tennenbronn (DE)

(73) Assignee: hofer powertrain innovation GmbH, Nürtingen (DE)

(*) Notice: Subject to any disclaimer, the term of this patent is extended or adjusted under 35 U.S.C. 154(b) by 179 days.

(21) Appl. No.: 18/024,759

(22) PCT Filed: Sep. 6, 2021

(86) PCT No.: PCT/EP2021/074496
§ 371 (c)(1),
(2) Date: Mar. 4, 2023

(87) PCT Pub. No.: WO2022/049285
PCT Pub. Date: Mar. 10, 2022

(65) Prior Publication Data
US 2023/0339312 A1 Oct. 26, 2023

(30) Foreign Application Priority Data

Sep. 4, 2020 (DE) .................. 20 2020 105 111.3
Sep. 4, 2020 (DE) .................. 20 2020 105 114.8
Aug. 12, 2021 (DE) .................. 20 2021 104 326.1

(51) Int. Cl.
*B60K 1/02* (2006.01)
*B60K 7/00* (2006.01)
(Continued)

(52) U.S. Cl.
CPC .............. *B60K 1/02* (2013.01); *B60K 7/0007* (2013.01); *B60K 11/00* (2013.01); *B60K 17/04* (2013.01);
(Continued)

(58) Field of Classification Search
CPC ........ B60K 1/02; B60K 7/0007; B60K 17/04; B60K 17/046; B60T 1/005; B60Y 2400/61
See application file for complete search history.

(56) References Cited

U.S. PATENT DOCUMENTS 9,783,036 B2 * 10/2017 Lang ..................... B60K 7/0007
2005/0211490 A1 9/2005 Shimizu et al.
(Continued)

FOREIGN PATENT DOCUMENTS

DE 102010007066 A1 8/2011
DE 102010010438 A1 9/2011
(Continued)

OTHER PUBLICATIONS

International Search Report and Written Opinion for PCT/EP2021/074056, Dec. 13, 2021.
(Continued)

*Primary Examiner* — Erez Gurari

(57) ABSTRACT

A drive block, i.e. a block-like electric drive, includes two drives for driving respective wheels. Each of the two drives can be driven by a separate electric machine, i.e. by a first electric machine and a second electric machine, respectively. The drive block further includes an inverter block and a parking lock. The inverter block and the parking lock can be situated on different sides of a structural plane defined through centers of rotation of the first and second electric machines.

20 Claims, 24 Drawing Sheets

(51) Int. Cl.
  *B60K 11/00* (2006.01)
  *B60K 17/04* (2006.01)
  *B60R 16/02* (2006.01)
  *B60T 1/00* (2006.01)
(52) U.S. Cl.
  CPC ........ *B60K 17/046* (2013.01); *B60R 16/0207* (2013.01); *B60T 1/005* (2013.01); *B60K 2007/0061* (2013.01); *B60Y 2400/61* (2013.01)

(56) References Cited

U.S. PATENT DOCUMENTS

| | | |
|---|---|---|
| 2007/0213160 A1 | 9/2007 | Lyons |
| 2016/0039276 A1 | 2/2016 | Takahashi et al. |
| 2016/0039277 A1 | 2/2016 | Falls |
| 2018/0236982 A1 | 8/2018 | Yano |
| 2019/0061504 A1 | 2/2019 | Bassis |
| 2019/0131851 A1 | 5/2019 | Herb |
| 2021/0379983 A1* | 12/2021 | Baillie .................. B60K 11/02 |
| 2023/0339312 A1* | 10/2023 | Schneider ............ B60K 7/0007 |
| 2024/0051387 A1* | 2/2024 | Yang ..................... F16H 37/041 |

FOREIGN PATENT DOCUMENTS

| | | |
|---|---|---|
| DE | 102011080236 A1 | 2/2013 |
| DE | 102012112377 A1 | 6/2014 |
| DE | 102013204784 A1 | 9/2014 |
| DE | 102014214821 A1 | 2/2015 |
| DE | 102013223409 A1 | 5/2015 |
| DE | 102015217875 A1 | 3/2017 |
| DE | 102018103483 A1 | 8/2018 |
| DE | 202018103672 U1 | 9/2019 |
| DE | 202019103770 U1 | 10/2020 |
| DE | 202019103771 U1 | 10/2020 |
| DE | 202019103778 U1 | 10/2020 |
| DE | 202019103779 U1 | 10/2020 |
| DE | 202019103781 U1 | 10/2020 |
| EP | 1000790 A2 | 5/2000 |
| EP | 2406111 B1 | 1/2014 |
| EP | 2719591 A1 | 4/2014 |
| EP | 2711247 B1 | 5/2016 |
| EP | 3463958 A1 | 4/2019 |
| EP | 3587157 B1 | 1/2020 |
| EP | 4025444 B1 | 7/2023 |
| JP | 2009120126 A | 6/2009 |
| JP | 2012-223016 A | 11/2012 |
| WO | 2017211793 A1 | 12/2017 |

OTHER PUBLICATIONS

International Search Report and Written Opinion for PCT/EP2021/074496, Dec. 8, 2021.

* cited by examiner

COMPACT BLOCK-LIKE ELECTRIC DRIVE WITH AN INVERTER BLOCK AND PARKING LOCK

TECHNICAL FIELD

The present invention relates to a drive block of an electric vehicle that includes two electric machines and in each case a transmission, which are arranged at least partially congruent with each other in a longitudinal vehicle direction, wherein the positions of the two rotary shafts of the two electric machines and a transmission output form an offset arrangement relative to each other, which appears as a V-shaped arrangement when viewed along a shaft direction.

BACKGROUND

Of particular interest are drive trains by which electric wheel drives for the two road wheels on a vehicle axle can be implemented using two electric machines. So-called single-wheel electric drives, as an example of such drives, offer the possibility of electric "torque vectoring". With regard to the arrangement of their components and their mechanisms of action, paired single-wheel electric drives can be implemented in various ways.

Some single-wheel drives are constructed using wheel hub motors, as described, inter alia, in DE 10 2014 214 821 A1 (applicant: Schaeftler Technologies GmbH & Co. KG). In drive concepts using wheel hub motors, the developers require installation space at each drive wheel because the motor, the transmission and possibly other components of the drive have to be installed directly next to the drive wheel, as can also be seen from the two figures of DE 10 2014 214 821 A1.

Therefore, when using electric drives to replace internal combustion engines in fully developed motor vehicles, it is in many cases easier to provide block-like and centrally arranged drive units at the position where the internal combustion engine and its components and add-on parts were formerly located.

On the one hand, single-wheel drives which are consolidated into blocks are known, in the case of which each one of two motors can drive one of the two wheels on an axle of a motor vehicle via a joint twin transmission, which is the connecting intermediate component that forms the block, as described, for example, in German utility models DE 20 2019 103 770 U1 (proprietor: hofer powertrain innovation GmbH), DE 20 2019 103 771 U1 (proprietor: hofer powertrain innovation GmbH), DE 20 2019 103 778 U1 (proprietor: hofer powertrain innovation GmbH), DE 20 2019 103 779 U1 (proprietor: hofer powertrain innovation GmbH) and DE 20 2019 103 781 U1 (proprietor: hofer powertrain innovation GmbH).

On the other hand, there is the concept of arranging two separate motors in a manner at least partially overlapping each other in the vehicle longitudinal axis, and providing on the end face of each a dedicated transmission, separate from the other transmission, for reducing the motor speed to a wheel speed or to a speed that at least approximates the wheel speed, as disclosed, for example, in WO 2017/211 793 A1 (applicant: Punch Powertrain N.V.), in DE 10 2010 010 438 A1 (applicant: Dr. Ing. h.c. F. Porsche AG) or also in EP 3 587 157 B1 (patent proprietor: hofer powertrain innovation GmbH).

While WO 2017/211 793 A1 and DE 10 2010 010 438 A1 still assume that a motor on a motor vehicle axle can only be used to drive one wheel, EP 3587157B1 discloses that the two motors, arranged axially one behind the other and laterally bordered by transmissions, can also be arranged in such a way that optionally one motor drives two wheels on one common axle, but a single-wheel drive is also possible with such an arrangement.

For such arrangements of single-wheel drives to form a drive block, which is also referred to as a "sandwich design" due to being laterally bordered by the transmissions, a problem in terms of installation space often arises, particularly in the case of more compact vehicles or in the case of sports cars.

DE 10 2014 214 821 A1 (applicant: Schaeftler Technologies GmbH & Co. KG) describes a wheel hub drive with two electric motors on a rear axle. At the end of the description, the specification considers how such a single-wheel drive device can additionally be equipped to brake the wheel drive device. In said document, a disk brake, a drum brake and a parking lock are mentioned as possibilities for braking a vehicle equipped with such single-wheel drive devices.

A single-wheel drive with a brake is discussed in DE 10 2010 007 066 A1 (applicant: Rheinmetall Landsysteme GmbH), which describes, inter alia, an axle component for an armored wheeled vehicle that can be assembled from a plurality of vehicle modules. As shown in FIG. 1, a trough that is divided into two installation spaces by a bearing frame accommodates two axle drives, which are driven by two separate electric motors arranged on top. A parking brake with appropriate brake disks, which is only shown schematically in FIG. 3, is said to be located in a transverse duct.

FIGS. 1 and 2 of US 2019/061 504 A1 (applicant: NIO USA, Inc.) show motor vehicles which are equipped with single-wheel drives. FIG. 7A shows an example of a spatial structure of such drives, the electric motors of which are arranged one in front of the other. An inverter is said to be mounted between the transmissions connected to the electric motors. The transmission is said to comprise an epicyclic reducer, with the output taking place via the planet carrier. The arrangement is said to be suitable for so-called "torque vectoring". The authors of US 2019/061 504 A1 additionally discuss integrating these components in a so-called "side-by-side housing".

Patent application DE 10 2018 103 483 A1 (applicant: Toyoto Jidosha Kabushiki Kaisha) relates to providing a drive force control system for a drive arrangement comprising two electric motors, which are each said to drive one wheel. The aim of the control is to keep the slip of the wheels as low as possible. The control is also said to take into consideration a drive force transmitting capacity of a clutch that serves to operate the first motor and the second motor as a connected unit. The control is said to be accomplished by a control unit using situation-related maps for particular drive situations, such as e.g., in the case of cornering, and using a torque sensor and a yaw rate sensor. There is said to be one parking lock on a front axle and one parking lock on a rear axle, which parking locks are said to be suitable for stopping either a rotation of a second output shaft or a rotation of a first countershaft.

Patent EP 2 406 111 B1 (proprietor: Nissan Motor Co. Ltd.) describes a parking lock device, with which it is said to ensure the parking lock device cannot be activated while the vehicle is traveling. This is said to be achieved by limiting the force for the actuator, which presses a pawl against a parking lock gear. In addition, in order to protect a right parking lock and to protect a left parking lock, a rotation of a right wheel and a rotation of a left wheel are said to be monitored separately by sensors.

EP 2 719 591 A1 (Applicant: Nissan Motor Co., Ltd.) mainly deals with the control of parking locks. If a vehicle is still moving, i.e., is not absolutely stationary, it is provided that, in addition to a first parking lock mechanism, a second parking lock mechanism will also be activated, which is said to be located on a different wheel. By contrast, if a vehicle is completely stationary, the activation of a single parking lock mechanism is deemed to be sufficient, thus making it possible to save energy involved in actuating the second parking lock mechanism. The vehicle is said to be driven via wheel hub motors on rear wheels of the vehicle, as shown in FIG. 1. The parking lock mechanisms are said to immobilize the rotary shafts of the wheel drive motors relative to the vehicle body. A control unit of the parking lock is said to take a road inclination into account when activating the parking lock.

DE 10 2011 080 236 A1 (applicant: ZF Friedrichshafen AG) relates to a single-wheel electric motor drive for a motor vehicle, which is referred to as being close to the wheel. With reference to eight drawings, which are numbered from 1 to 7, six different placements of a parking lock on a single-wheel electric drive are proposed using line drawings. FIG. 2 shows a pawl in an open parking lock position in diagram "a)" and a pawl in a closed parking lock position in diagram "b)". A conventional parking lock of this type is implemented by a pawl and a parking lock gear. FIGS. 1 and 3-7 show a detail of a torsion beam axle, in which an electric motor/transmission unit comprising an electric motor and two transmission stages, namely a planetary transmission and a pinion/spur gear arrangement, is shown in a sectional view below a torsion profile. In these figures, the parking lock is shown schematically at different positions on the drive arrangement, namely on a drive shaft of the motor, on a carrier, on a connecting shaft, in the region of a pinion/spur gear arrangement, or on an output shaft.

Patent application JP 2009-120 126 A (applicant: Mazda Motor Corp.) shows in FIGS. 4, 5, 7 and 14 a block-like dual motor, with one transmission belonging to each motor. The two motor blocks are said to be arranged coaxially next to each other and to each be supplied by an inverter. FIG. 8 shows a parking lock unit. A locking lever having a pawl is said to be able to engage in a gear of a planetary transmission (cf. FIG. 6 (b)). The parking locks of the two transmissions are said to be able to be actuated in a synchronized manner by means of a pantograph, as shown in FIG. 9. As an alternative, with reference to FIG. 11, it is proposed to provide a vehicle control unit in conjunction with an actuator for actuating a single parking lock. One special design feature of the motor arrangement is that an exhaust pipe is said to be routed between the two motors.

The documents mentioned above are hereby incorporated by reference in their entireties. This is to avoid having to explain anew the well-known relationships between single-wheel drives and the structural arrangement of the individual components; instead, through reference to the documents, these relationships are to be regarded as likewise defined for the present invention.

SUMMARY

As stated, the development of an electric drive train comprising two (single-)wheel drives provided by two separate motors or electric machines leads to increased requirements in terms of the necessary installation space. At the same time, however, the desire for reliable, safe drives, which ideally have safety features already built in, cannot be ignored.

The question therefore arises as to how it is possible to realize the attractiveness of electric motor-driven (single-) wheel drives in tight installation spaces and yet still be able to give consideration to special safety requirements.

Motor vehicles that are to be driven by an electric motor require at least one electric machine, such as e.g., a synchronous machine, or e.g., an asynchronous machine or further developments derived from these basic types of electric machine (reluctance motor, wheel hub motor, canned motor, resistance rotor, Ferraris' motor, etc.). Usually a motor that rotates at a speed higher than a wheel speed is used as the drive motor in a passenger car, the speed of the motor being reduced to an (appropriate) wheel speed, e.g., in a speed range between 0 rpm to less than 2000 rpm, or in an alternative embodiment up to a maximum speed of approx. 2600 rpm, by a transmission situated on the output shaft of the motor.

If each wheel on an axle of a motor vehicle can be driven by a separate motor, this can be referred to as a single-wheel drive; however, there are also transmission arrangements—as is known or see above—by which (optionally or depending on a switch position) one of the motors or even both motors can be switched as axle drives instead of single-wheel drives. Advantageously, such a drive block comprising two electric machines, i.e., a first electric machine and a second electric machine, either drives one complete axle of a motor vehicle, or each electric machine drives one single road wheel on the axle of the motor vehicle that is to be driven. As stated, switchable hybrid forms can also be present on an axle of a motor vehicle, which, depending on the switching state, e.g., of a switchable differential, can be used either as a single-wheel drive or as an axle drive. If each electric machine drives one road wheel of the motor vehicle, "torque vectoring" (yaw angle control of the motor vehicle) can be operated through actuation of the electric machines, e.g., via an inverter, in particular by frequency control.

It is particularly advantageous if the individual components of one (sub-)drive can be pushed into the identical components of a second (sub-)drive, i.e., are arranged so as to move toward each other, which can also be referred to by the words "nestingly arranged". In this case, it is possible to equip each (sub)—drive separately with all the components for driving a single wheel or even for driving a motor vehicle axle.

If the individual components of the drive block can be arranged in a compact block, then it is possible (in theory) to tailor the drive block, in terms of its dimensions, to the dimensions and shape of an internal combustion engine together with the units arranged thereon. The form factor corresponds (substantially) to an internal combustion engine together with its add-on units and, where applicable, its encapsulation. Such motors can be installed in a longitudinal vehicle direction, e.g., in an engine compartment beneath a hood. Here, the drive block can be provided for transverse installation in a motor vehicle. A transverse installation of the drive block can refer to an orientation in which the wheel drive shafts projecting out of the block are directed toward the wheels to be driven; there is no deflection through 90° to pass from the wheel drive shafts to the wheels on the axle.

If the maximum dimensions of the drive block correspond to the widths, heights and/or lengths of an internal combustion engine designed to drive a motor vehicle, it is possible to continue using a fully developed body and to insert the drive block as a replacement for a drive comprising an internal combustion engine. The installation space provided for an internal combustion engine can be used or occupied by the drive block. Other components that may usually be installed in the engine compartment, such as an auxiliary steering and/or steering assistance system, can continue to be retained unchanged in the engine compartment.

If the first electric machine drives a first single wheel, a first (reduction) transmission is required due to the higher speed of the electric machine and/or the angular velocity, which is too high for a wheel drive. If a second electric machine drives a second single wheel, a second (reduction) transmission is required due to the higher speed of the electric machine compared to the road wheel. If the transmissions are respectively attached to an end face of the first electric machine and to an end face of the second electric machine, this results in a (sub-)block consisting of one electric machine and an associated transmission. If the two electric machines are arranged in parallel with regard to their longitudinal extent, e.g., with regard to their rotor axes or their rotating axes, and one behind the other with regard to their housing, this results in a block composed of two L-shaped motor/transmission units.

The transmissions, that is to say the first transmission and the second transmission, can be implemented by a plurality of spur gear stages or also by a planetary transmission. Of course, it is also possible to implement one stage as a planetary transmission and another stage as a spur gear stage. Two output shafts, one shaft per transmission, can be led to a summing transmission (e.g., to a switchable planetary transmission or a switchable differential transmission), so that the summing transmission, which is ideally switchable, interconnects the electric motor-driven single drives to form an axle drive.

As already mentioned above, the connection to the road wheels takes place via wheel drive shafts, which can also be adequately referred to as drive shafts. The (wheel) drive shafts can be connected to the output(s) of the transmissions via links. Depending on the position of the outputs, however, it is also possible to design the drive shaft for one of the wheels as a direct part of the transmission. This depends not least on the relative position of the output gear constant (the "final drive"), how far the transmission (either the single-wheel transmission or the summing transmission) has to be routed toward of the (road) wheels. If a shaft having at its ends a shaft stub provided with a shaft toothing is used as the wheel drive shaft, the transmission can end with an internally toothed ring gear. If the wheel position is aligned with the output of the transmission, the wheel drive shaft and the output gear constant can be formed in one piece.

If the electric machines are motors which are operated with an AC voltage, either single-phase or multi-phase, such as e.g., three-phase, then at least one inverter is required as a further component of the drive block; preferably, however, two inverters are used, one inverter per drive formed of the electric machine and the transmission. The two inverters are advantageously placed onto the double L-shaped block formed of two electric machines and two transmissions situated at the cylindrical ends of the housings of the electric machines. In this case, the drive block is intended for an installation in which ideally the electric machines and the transmissions are placed in a lower area, while the inverters are arranged above the drive shafts of the electric machines, i.e., facing away from the ground. In the installation position (when the drive block has been oriented for installation in a motor vehicle (marriage with the chassis)), the heavier electric machines form the base of the drive block. The lighter inverters, which are often thermally more sensitive, and in some cases also mechanically more fragile, are located—in one embodiment—in an area which, compared to the electric machines, is more remote from the ground. The two electric machines create a structural plane. The inverter(s) can be placed in relation to the structural plane.

Each drive combination, composed of an inverter, an electric machine and a transmission, constitutes a separate drive. Advantageously, such a drive has a parking lock. In this case, the parking lock is responsible only for this one drive. That is to say that each drive (or sub-drive) is equipped with a separate parking lock for blocking an output shaft that leads out from the drive to a wheel.

In other words, the drive block is intended to be installed in a motor vehicle. Such a motor vehicle has a longitudinal vehicle direction. Such a motor vehicle has a transverse vehicle direction. If the drive block is to be installed in the motor vehicle, an installation position of the drive block can also be specified in relation to the longitudinal vehicle direction and in relation to the transverse vehicle direction. The longitudinal vehicle direction is the direction on the vehicle in which the vehicle can be moved (forward travel and reverse travel). The transverse vehicle direction is the direction on the vehicle that is transverse to the longitudinal vehicle direction.

The drive block, which comprises both a first electric machine and a second electric machine, has the two electric machines arranged one behind the other—in particular when viewed along the longitudinal vehicle direction. In this case, the electric machines are arranged congruent with each other. That is to say that, depending on the viewing direction, the first electric machine covers the second electric machine (when viewed from the side) or the second electric machine covers (at least partially) the first electric machine.

Ideally, the drive block is designed in such a way that it can be used as a component for transverse installation in a motor vehicle. To this end, for example, suitable bearing and fixing points must be provided on the drive block.

Each electric machine has a rotary shaft. The rotary shaft of one electric machine can be used together with a rotary shaft of the other electric machine to define a structural plane through the two centers of rotation of the electric machines.

The transmission can then be arranged offset from the electric machines. A transmission output thus takes place in a manner spatially offset from the arrangement of the electric machines. The output from the transmission takes place at a different point than a point at which drive power was input into the transmission. In one possible embodiment, there are two separate transmissions. In an alternative embodiment, the two single transmissions are coupled together by a further summing transmission to form an overall transmission.

Each of the two electric machines has its own center of rotation. The respective rotary shaft of the electric machine runs through the center of rotation of this electric machine. The two rotary shafts run in such a way that an imaginary or structural plane can be defined through the two rotary shafts. Ideally, the rotary shafts run in parallel. A structural plane can thus be defined through two structural lines (shafts or axles) arranged in parallel.

Advantageously, however, the transmission output is not to be found at a position on this structural plane; instead, the transmission output is to be found laterally offset from the structural plane.

It can also be said that the structural plane results from the two rotary shafts, for which purpose a position that is lifted off the structural plane exists and is defined by a center in the transmission output.

In the available installation space, it is possible to define a further plane, which in one embodiment is at a 90 degree angle to the first structural plane. This second plane is determined from the previously defined point of the transmission output (or position of the transmission output) and by points on the rotary shafts. This plane runs parallel to one of the transmissions.

The two points of intersection between the rotary shafts and the plane parallel to the transmissions and the position resulting from the transmission output can create a structural arrangement that forms the letter "V" (an opened-out character comprising two wings joined together at the bottom). An angle smaller than 180 degrees can be defined between the two strokes of the "V", i.e., the arms.

An inverter block, which is formed of up to two inverters enclosed in housings, each inverter being responsible for a separate sub-drive, can be placed on one side of the structural plane.

Another component for the drive block is a parking lock device.

The two electric machines can be regarded as centrally placed elements. On the one hand, if one or more inverters are required for the electric machines, the inverter block must be placed next to the electric machines. If the drive block has a parking lock device, the parking lock device—placed to the side of the electric machines—is part of the drive block. The inverters or the inverter block are/is required if, for example, one or more AC voltage(s) intended for driving the electric machines are to be derived from a DC voltage available in the motor vehicle.

The inverter block may have a cantilevered design. However, at least part of the inverter block is advantageously located between the two transmissions, e.g., with its entire housing. If, however, the electric machines are so short that an inverter board (board comprising electronic components) is longer than the electric machines arranged congruent with each other, part of at least one of the inverters may protrude beyond the electric machines, e.g., may extend above a transmission housing.

It is advantageous if at least the outer housing walls can be observed as the (imaginary) limit for the extent of the inverter block.

A compact arrangement with the outer limits of the "transmission", more precisely the outer housing walls of the transmission, results overall in a compact unit, the transverse extent of which is limited to the width from transmission to transmission, in particular from reduction transmission to reduction transmission.

Presented below are advantageous embodiments and developments which, considered per se, both individually and in combination, may likewise disclose inventive aspects.

Advantageously, at least the housing of one of the transmissions (and thus the housed part of the transmission) is placed on an end face of the electric machines. When a transmission is placed on the end face of the motor, the motor shaft can act in the transmission directly.

In plan view, the housing of a (reduction) transmission can be described by the word "ellipse". The housing of a transmission is designed in a manner similar to an ellipse or with an elliptical silhouette. In plan view, one particularly advantageous housing is like the connection of two elliptical sections which are connected to each other at transition points.

In general, it should be recapitulated that an ellipse is characterized by the presence of two foci (as construction points). The circular arc-shaped boundaries of the housing are "constructed" around the foci. The housing thus has two foci. The housing is advantageously a shallow housing, which consequently has only a relatively short extent in the "height" direction (compared to the focus-to-focus distance). The housing has a longest extension due to its elliptical shape. The housing can also be described as an oval housing of small height. On an upper side, there is a circular arc-shaped end region. On a lower side, there is a second circular arc-shaped end region. Between the two circular arc-shaped end regions, which (may) have a different diameter from each other, the housing may run or be formed in a rectilinear manner along a housing part located at a distance from the focus-to-focus axis.

Advantageously extending outward at one of the foci of a housing is a rotary shaft, on which e.g., a drive gear is placed. The rotary shaft coincides with the one focus.

It is also advantageous if the transmission output is located at the other focus.

If lines (or straight lines) are drawn through the foci in order to determine diameters, a straight line through one focus has a wider diameter of the housing than a straight line that goes through the other focus of the same housing.

Advantageously, the transmission is a transmission comprising two gear stages. By providing more than one gear stage, it is possible to achieve a larger spread in the transmission. Division ratios of more than six can thus be created. In this way, it is possible to use electric machines that rotate more than six times as fast (compared to the desired wheel speed). The transmission thus has a first stage and a second stage. Each of the stages can also be referred to as a gear stage. The output of the first gear stage is then passed to the input of the second gear stage.

In this case, it is possible to combine different types of transmission, e.g., first to place a planetary transmission stage on the output side of the rotary shaft, with the output of the planetary transmission stage being passed to a spur gear transmission stage. First, the speed is reduced by a planetary transmission stage. This reduced (intermediate) speed is then introduced into the drive gear of a spur gear transmission stage.

The drive block is designed to be so compact that the entire drive block can be accommodated in an installation space of cuboidal shape. The drive block is designed to be installed in a cuboidal installation space of a motor vehicle. Such a cuboidal installation space of a motor vehicle can be described by boundary surfaces. In the case of a cuboidal installation space of a motor vehicle, the boundary surfaces are at right angles to each other. The central placement of the electric machines and the placement of the other components to the side thereof fill up the installation space and result in components of the two drives arranged in a rectangular installation space.

If there are boundary surfaces oriented at right angles to each other for the motor vehicle installation space to be used, then the positioning or the orientation of the inverter block can be oriented in relation to one of the boundary surfaces. The inverter block can extend with its surface extension parallel to a boundary surface.

Placing the structural plane through the two rotary shafts of the two electric machines ensures that an area of the drive block can be divided into an area above the structural plane and an area below the structural plane, with the inverter block advantageously being situated above the structural plane. The inverter block is thus situated further from the ground. The inverter block above the structural plane is the part of the drive block that is remote from the ground (from the road).

The inverter block is situated on a side of the structural plane that can be referred to as the first side.

As already mentioned above, the drive block advantageously has a parking lock. The parking lock is responsible for inhibiting rotation. When the parking lock is engaged, it is intended to inhibit rotation of the wheel drive shaft. The parking lock can be placed on a second side of the structural plane, compared to the first side of the structural plane for the placement of the inverter block.

If the parking lock is situated on the second side in relation to the structural plane, one of the inverters can be placed on a side of the structural plane remote from the ground.

The first electric machine has a certain width, which can also be referred to as the first electric machine width. Electric machines are often of predominantly round shape, so that the electric machine width corresponds to twice the electric machine radius. The second electric machine has a second width, the second electric machine width, which may likewise correspond to twice the electric machine radius if the electric machine has a substantially round housing.

The housings for the transmissions may be larger than a cross-sectional area formed by the two radii or diameters of the two electric machines arranged one behind the other. Each of the housings advantageously protrudes laterally beyond this double cross-sectional area.

At least one of the inverters may be installed in an encapsulating housing. The encapsulating housing of the inverter may be separate from the electric machines, in the manner of a block (in which case the housing of the inverter may be an integral continuation of the electric machine housing).

The housing of the inverter, which in particular is block-like, extends (or is built) to a much lesser extent in terms of height than in width and length (in a manner similar to the transmission housings). The inverter is a shallow, narrow, extending box. The inverter has a narrow side that can be situated transverse to one of the rotary shafts.

The inverter has a narrow side that can be situated as an end face of the drive block or as part of the end face of the drive block. The end face can be oriented transversely to the transverse direction of the motor vehicle.

At least one of the parking locks present can be situated to the side of the drive block. The parking lock can laterally bound the drive block as a terminating element.

The two electric machines may be arranged somewhat offset from each other. One electric machine may be situated higher than the other electric machine in relation to the vehicle floor or in relation to a road. The electric machines are seated in the drive block in a manner offset from each other. With reference to the attachment points of the drive block, it can be determined that one electric machine is intended for a higher position in a vehicle than the other electric machine (if the drive block will be installed in a vehicle).

The centers of rotation of the electric machines may be arranged at different points in relation to the longitudinal vehicle direction. The centers of rotation may be at different distances in relation to a reference plane of the motor vehicle intended that is to receive the electric machines.

Further interesting aspects of a drive block outlined above will be set out below.

The drive block can also advantageously be designed such that the drive block includes two actuators, each of which is there to actuate a separate parking lock per (sub-)drive.

The parking lock actuators are preferably placed in an area of the drive block close to the ground, in particular if they are enclosed by suitable housings. In such a case, this means that the parking lock actuators are situated within the drive block in an area facing toward the ground. In other words, the parking lock actuators can advantageously be situated in a lower area of the drive block. The parking locks can be situated between the transmissions arranged on the output side, in particular in an area close to the ground.

The parking locks are there to enter a locked state when the drive, and thus the vehicle, is to be prevented from rolling away. The locked state can be brought about by inhibiting rotation. The inhibition of rotation can be accomplished in the transmission. Each transmission has its own parking lock.

In an alternative embodiment, instead of two parking lock actuators, it may also be provided that just one parking lock actuator can actuate both parking locks synchronously or simultaneously, i.e., at the same point in time.

The parking lock actuation mechanism, either one common actuator or a plurality of separate actuators, can be seated between the transmission housings.

Advantageously, each of the parking locks is designed such that, in a locked state, it rotationally immobilizes a planetary gear stage of the transmission by engaging in a planet carrier. In the locked state, the respective parking lock inhibits rotation.

It is possible for the parking lock to act at different points.

In one embodiment, the parking lock immobilizes an output gear.

In one embodiment, the parking lock immobilizes an input shaft of the transmission.

In one embodiment, the parking lock blocks the smaller pinion of two pinions that form a transmission stage.

In one embodiment, the parking lock immobilizes an output gear of the geared transmission stage. Even at this point, it is sufficient if a torque of less than e.g., 3000 Nm can be blocked, such as e.g., 2200 Nm.

The respective parking lock can be realized as a parking lock that is to be actuated hydraulically through its actuator. It is also possible that the parking lock operates through its actuator as a parking lock that is actuated by an electric motor.

One advantageous embodiment is a pawl-type lock, i.e., a parking lock which can be placed in its immobilized or locked state by virtue of a pawl.

It is also advantageous if the parking lock has an energy store, e.g., in the form of a strong annular spring, for releasing the parking lock. Alternative possibilities are offered by compression springs, conical springs or barrel springs.

Advantageously, a pawl of the pawl-type lock engages in a ring gear of a planetary transmission. The planetary transmission may have a ring gear connected (by a plug-in connection, welded, riveted or the like) to its output side, e.g., to the planet carrier, which ring gear performs the task of a locking gear. The transmission can be immobilized by the engaging pawl. To this end, external teeth may be present on the ring gear, e.g., in the form of a toothed outer rim. The ring gear is an additional component beside the planetary transmission.

The transmission has pinions of different sizes. Advantageously, a smaller of the pinions available in the transmission is selected to inhibit motion in the smaller pinion when a parking lock is engaged.

As already mentioned above, in one development the transmission can be composed of a planetary transmission stage and a geared transmission stage, with one stage following the other stage. The two transmission stages are arranged in a row one after the other.

Both transmission stages have ratios to reduce the speed.

The drive block can be locked by pawls, which are mounted on dowel pins. The pawls are located on dowel pins, e.g., on pins which are less than 15 mm thick, e.g., just 10 mm thick. Such a dowel pin can be very short, e.g., less than 70 mm. It is thus possible to fit the entire parking lock, together with its actuator, in the tight installation space.

The parking locks may be rod-controlled. Rod control enables the parking lock actuator to be arranged at a different location than the parking lock (itself).

One of the transmissions may comprise multiple transmission stages (but it is also possible for both transmissions to comprise multiple transmission stages), e.g., two transmission stages, of which one transmission stage is a planetary transmission and one transmission stage is a geared transmission. Both transmission stages reduce the rotational speed or the number of revolutions; they are speed-reducing transmissions with a ratio in the range from 50 to 100.

The combinations and exemplary embodiments presented above can also be considered in numerous other connections and combinations.

For instance, it is possible, inter alia, to design the transmission housing and the electric machine housing as an overall housing. In this case, a first component is the electric motor-driven drive consisting of the electric machine and the transmission. A second or further component is the associated inverter.

The pawl-type lock can operate either with or without springs. A spring can be part of the lever mechanism to facilitate release of the pawl-type lock.

It has proven to be advantageous if at least one of the inverters is a shallow box or, particularly in the case of a drive block constructed with two electric machines, more preferably both inverters are shallow boxes, which may for example be square. Each box can be dimensioned such that it forms approximately half of an upper side of the drive block. The first box, i.e., the first inverter, covers e.g., the right-hand side of the two electric machines arranged one behind the other, as a shallow unit spanning the latter. The second inverter can be arranged next to the first inverter. The second inverter can also cover both electric machines from above. The second inverter ideally has the same dimensions as the first inverter. The two inverters form the upwardly bounding cover with their upper housing shells.

The underside of an inverter may be designed to be arranged on a support plate. The support plate may be a flat cover plate which forms the bridge element across the two electric machines. The support plate rests as a flat cover plate on the two electric machines. Vibrations of the electric machines or of the drive block are lessened if the support plate is sufficiently robust and at the same time is mounted in a manner that is advantageous in terms of vibration, so that the electronics of the inverter or both electronics of both inverters are subjected only to reduced oscillations and vibrations (ideally none at all).

In one advantageous embodiment, a cable connection adapter may be provided for each inverter. In one advantageous development, the two cable connection adapters differ from each other, with each cable connection adapter being designed for connection to one inverter. A cable connection adapter leads to an electrical connection of the inverter, to which the cable connection adapter is attached.

Incidentally, the components mentioned above, such as the first electric machine, the second electric machine, the first transmission, the second transmission, the first inverter and the second inverter, may in each case be designed as standard parts. It can also be said that the electric machines are designed as standard parts. Similarly, it can also be said that the transmissions are designed as standard parts. It can also be said that the inverters are common parts. In one advantageous development, the cable connection adapters differ from this and distinguish whether the first (sub-)drive block is a left or a right (sub-)drive block and whether the second (sub-)drive block is a right or a left (sub-)drive block.

Such a cable connection adapter may be designed to be placed on the side of the inverter. The cable connection adapter determines where a connector is positioned laterally in relation to the inverter. As mentioned above, the inverter has a shape that is shallow but covers a (certain) length and a (certain) width. The inverter thus has a longitudinal extent or a width that ideally corresponds (substantially) to the width of the two electric machines arranged next to each other and/or offset from each other—in the sense of an overall width. The cable connection adapter therefore has a width that corresponds to the width of the two electric machines or, in the case of cylindrical housings of the electric machines, to the diameters of the electric machines when these are located fully next to each other.

Advantageously, the cable connection adapter is intended to make it possible for a power supply cable, which establishes an electrical connection from an electrical energy store, e.g., a lithium-ion battery pack, to the inverter via the cable connection adapter, to be connected by means of a connector, so that the inverter can be supplied with electrical energy from the electrical energy store.

A cable connection adapter can also be referred to as an electrical energy supply point. Each inverter has its own cable connection adapter, it being possible for the cable connection adapter of the first inverter to differ from the cable connection adapter of the second inverter in terms of their specific designs. The connector positioning, which is present at a point on the longitudinal extent of the cable connection adapter, is advantageously placed between the energy store or a central energy source and the input of the inverter, an electrical connection of the inverter, in order to form an overall length. Advantageously, the motor vehicle has a single central energy source as the energy store.

In this way, a current path length can be defined. The current path length results from the length of a connection cable between the energy store and the connector positioning of the cable connection adapter as well as a cable routing within the cable connection adapter. If, due to cable routing within the motor vehicle, the length of a power supply cable on one of the cable connection adapters is shorter than the length of a cable on the other cable connection adapters, then the (total) length, the inductance, the resistance and/or the signal propagation times on the electrical connections between the energy store and the drive block can be equalized through cable routing within the cable connection adapter. Different lengths of the different connection cables can thus be equalized.

It is advantageous if a cable connection adapter does not have just one position or one connector into which a mating connector of a power supply cable can be inserted, but instead a cable connection adapter offers a movable connector position or a plurality of connectors. One of the plurality of connectors can then be selected, depending on the cable routing or the length of the power supply cable. If the cable connection adapter offers a plurality of connector positions, a connection cable can be connected to any one of the available connector positions. The connectors or connector positions can be designed in such a way that a connection cable can optionally be connected to one or another position or to one or another connector.

The transmission housing is advantageously an elliptical housing or a shallow, elongated housing modeled on an elliptical shape, which is additionally situated at an angle (in relation to the ground or a road). If the two electric machines are situated (slightly) offset from each other (with regard to a base height), an additional length of installation space required for the transmission can be created by placing the transmission housing at an angle. In the case of an elliptical transmission housing, one of the foci of the ellipse, which is formed by a freewheel of the housing, may be an exit point for a wheel output shaft. A wheel output shaft exits from the transmission housing in the region of the focus. In this context, a focus is understood to be a design aid when forming the ellipse (according to conventional ellipse geometry). An ellipse (usually) has two foci and a center, as well as associated semi-axes. One of the foci is used as an exit point from the housing. One of the foci can be used as an entry point for a drive shaft of the electric machine. Drive power is introduced into the transmission at one focus, and drive power is output from the transmission at the other focus.

Each transmission advantageously has its own housing, i.e., the transmission housing associated with the transmission. Each transmission comprises a transmission housing. A transmission is equipped with a transmission housing.

The transmission housings extend further in the downward direction than the electric machines. A transmission, more precisely a transmission housing, is to be found in the region of a lowest point of the drive block. The transmission housing extends further into an area closer to the ground than either of the electric machines. The electric machines likewise have a lowest point. However, this lowest point is further away from the ground or the road than the lowest point of one of the transmission housings.

Advantageously, the transmissions flank, with their lower ends, an installation space that extends parallel to the electric machines between the transmissions. The electric machines can be bordered by further components from the underside. The electric machines are located in a central area. The installation space bordered laterally by the transmission housings is bounded in the upward direction by the electric machines.

The uppermost side of the drive block may be equipped with cooling fins. If the inverters are the highest components of the drive block, the cooling fins are located on the inverters. While electric machines are often not only mechanically more robust than inverters, but also can be much more easily designed for higher operating temperatures, many electronic components that have to be installed in an inverter encapsulated by a housing are thermally more sensitive, or the components have only a lower maximum operating temperature. If the cooling fins are situated on the upper side of the drive block, the temperature of the inverters can be lowered by air convection, e.g., by means of a motor vehicle fan (for example a viscous fan or another clutch fan).

In one advantageous embodiment, which is particularly compact, the component combination of electric machine and transmission is reminiscent of the capital letter "L"; the arrangement of the two components "electric machine" and "transmission" relative to each other can also be referred to as L shaped. The inverter is reminiscent of a block. Identical inverters, as a first inverter and as a second inverter, can be part of the drive block if one of the two inverters has been rotated about its vertical housing axis relative to the other inverter and thus the two inverters are situated as a mirror image with respect to each other (in particular relative to a mirror symmetry point). Ideally, the two housings of the inverters are arranged at a small distance from each other, so that a separation gap is formed between the housings of the inverters. The point for the point-symmetrical mirror imaging of one inverter relative to the other inverter can be placed in the middle of this separation gap.

It is particularly advantageous to place the inverters on damping attachment points, e.g., on damping bearings. The inverters can be part of the drive block and yet be vibrationally decoupled from the rotating electric machines. A damping suspension ensures that each inverter stays in place.

If the individual (sub-)drive blocks are compared with each other, each (sub-)drive block has its own electrical connection, ideally its own cooling circuit inlet, ideally its own cooling circuit outlet, and ideally attachment points that can be found as a mirror image on the other (sub-)drive block. The components of the drive block are thus associated with each other. The two (sub-)drive blocks are designed such that, when pushed together, they form an overall block which, in terms of its dimensions, corresponds to a (conventional) internal combustion engine of a motor vehicle, in particular a small motor vehicle.

The drive units discussed above, which are assembled from two single-wheel drives in a block-like manner, can also be described as follows.

The drive block is advantageously designed such that each driven road wheel can be supplied with torque from a separate electric machine. A drive is said to be a separate drive, in particular of a single road wheel, if the electric machines provided for moving the vehicle can be individually supplied with a preferably different drive power from an electrical energy store, either using an inverter or not.

To provide a required torque for a road wheel, a rotation of the electric machine is stepped down in each case in a transmission arranged in the torque flow between the electric motor and the road wheel.

The drive block is designed to be space-efficient and as compact as possible for installation in a motor vehicle.

From another perspective, it can also be said that the motor vehicle has a longitudinal vehicle direction which extends from a front wheel of the vehicle to a rear wheel of the vehicle (and runs beyond these). Without preference for one orientation or the other, the longitudinal vehicle direction can extend from the front of the vehicle to the rear of the vehicle or from the rear of the vehicle to the front of the vehicle, depending on which direction of travel is being considered. To form design aids, a vehicle longitudinal axis and/or a vehicle transverse axis can be "placed" centrally in the vehicle along a longitudinal vehicle direction, which can also be referred to as the vehicle longitudinal direction, and aligned with a transverse vehicle direction, which intersects the longitudinal vehicle direction and can also be referred to as the (motor) vehicle transverse direction. The design aids provide references for arranging the components of the (sub-)drive. In the case of transverse installation in the vehicle, a transmission shaft for example, such as the transmission input shaft and/or the transmission output shaft, extends along a vehicle transverse axis. Ideally, a vehicle longitudinal direction is to be situated as extending at right angles to a vehicle transverse direction. Examples of vehicle components which are usually installed in a motor vehicle transverse direction are motor vehicle axles, as well as steering linkages. The vehicle longitudinal axis and the vehicle transverse axis, which in particular intersect each other, span a plane as a (further) design aid, which in the vehicle separates a half-space close to the ground from a half-space remote from the ground. Extending perpendicularly to the plane is an (imaginary) vertical axis of the vehicle, which is directed both toward the ground and toward the sky. One part on the axis (vehicle vertical axis) can be referred to as an area close to the ground, which is situated below an area less close to the ground or below an area more remote from the ground. These location specifications "area close to the ground", "area remote from the ground", "vehicle vertical axis", "vehicle longitudinal axis" and "vehicle transverse axis", can be used to specify a geometric placement of a smaller component, such as a parking lock and/or a parking lock actuation mechanism, in a larger entity, such as the drive block or the vehicle. The axes, planes and areas serve as a design aid here.

A parking lock actuation mechanism serves to actuate at least one of the parking locks. In one embodiment, this actuation mechanism can be actuated manually, in an extremely energy-efficient manner, via a selector lever as a first component of the actuation mechanism. However, the parking lock actuator as the power source of the actuation mechanism may also comprise a direct current motor or a hydraulic or pneumatically movable piston/cylinder arrangement. If there is a power source, the selector lever can be implemented purely as a trigger button. However, the selector lever may introduce a portion of the actuation energy, while the power source supplies a further portion of the actuation energy for the parking lock actuator. A direct current motor (DC motor) can be integrated in a purely electrically powered vehicle using few additional components. An inverter downstream of the power store is not necessary. A DC motor that can draw at least some of its energy from an additional electrical capacity or from an additional power store is particularly advantageous.

Following a failure in the power supply to the drive system, below a suitable threshold speed in the rotation of the DC motor, the parking lock can automatically move into a locked position, particularly in cases where a sufficient store of energy is available.

The parking lock actuation mechanism comprises at least one, preferably exactly two, parking lock actuators. One component of a parking lock actuation mechanism may be a parking lock pawl or a locking pawl, a locking lever, a locking pin or a detent.

If a pawl is present as the locking element, this pawl has an engagement region which, at a receiving region that has a shape complementary to the engagement region, such as at a tooth, at a tooth gap, at a claw or at a gap in the claw, can block a rotational movement in a first direction of rotation and in a second direction of rotation opposite to the first direction of rotation. These directions correspond to a forward and backward rolling direction of a vehicle.

The engagement region and the receiving region are equipped with at least two locking flanks, which are preferably shaped in a manner complementary to each other. A locked state of the parking lock exists when the pawl is in an engaged position. A connection between a rotatable transmission component and a non-rotatable transmission component can thus be established via the pawl, so that the rotational degree of freedom that exists in the unlocked position is lost as a result of the locking action. The receiving region may be formed, for example, on a detent plate or on a parking lock gear.

In one embodiment, the parking lock engages in the course of a rotation of the rotatable transmission component. A pressing mechanism can comprise an elastically extensible component of the parking lock actuation mechanism.

If a pawl is present, the pawl thus moves into a latching position.

One example of a pressing mechanism is a roller rotatably mounted relative to the transmission housing on a spiral spring, which can also be referred to as a pressure spring. The roller can be brought to bear against a spine of the locking element, e.g., the pawl, by means of a selector lever and/or an actuating linkage of the actuation mechanism. The parking lock actuation mechanism may thus comprise multiple components which, individually and/or in combination, improve the function of the parking lock.

One component of a parking lock actuation mechanism may be a dowel pin, about which the locking element, e.g., the pawl, is pivotably mounted. By way of a relative movement, such as a rotation of the pawl, the engagement region of the pawl can be moved in a radial direction toward the receiving region, as a result of which the locked state can be established. Forces that act on the locking flanks in the receiving region can be diverted via the dowel pin to the transmission housing, in particular without the pawl changing its position.

Release of the parking lock, e.g., in a manner triggered via the selector lever, is brought about by pivoting the pawl in a relative movement, as a result of which a gap is created between the engagement region and the receiving region, in particular in a radial direction. In one advantageous development, the pawl is pivoted back as far as a stop, with a rotatability of the transmission being retained. The stop ensures that the pawl only has to travel a short distance before it engages.

As a component or module of the parking lock actuation mechanism, an actuating linkage can comprise a number of components, such as at least one of the following components: at least one push rod; at least one joint; at least one deflection lever; at least one turntable; at least one stop; at least one guide or; at least one spring, such as a return spring, a pressure spring or a compensating spring.

Preferably, the actuating linkage includes at least two such components, in particular in pairs. The actuating linkage establishes a connection, preferably a form-fitting connection, between at least one locking flank (or also two locking flanks) and the selector lever or the parking lock actuator.

A flank slope in the region of one locking flank may, in collaboration with a compensating spring for example, prevent the parking lock from engaging if the speed of a vehicle is greater than a threshold speed. The threshold speed may be, for example, between 1 km/h and 10 km/h. If the latching element is a pawl, the return spring aids disengagement of the pawl when the driving mode is to be resumed.

If the parking lock actuation mechanism comprises at least one position sensor, such as a pawl sensor, or a rotation sensor, such as a parking lock gear sensor, a motor control unit may continuously detect the present state of the parking lock. Actuation of the pawl for latching purposes can be synchronized with the rotary position of the parking lock gear.

In one embodiment of the drive, the drives provided by the drive block can also be referred to as non-branching drives.

According to a further aspect in the design and assignment of the drive combination to the respective road wheel, particularly when one of the drivable road wheels on an axle is in low-traction contact with the ground, the vehicle can be kept completely stationary by way of the other drivable road wheel on the same axle by using the separate electric motor belonging to this other road wheel and by using the associated parking lock. The stationary state of the vehicle is ensured since activation of the first parking lock of one road wheel (the one without traction) simultaneously locks the other road wheel (with traction) against rotation by activating the second parking lock of this other road wheel. By branching the flow of force from the parking lock actuator, a single parking lock actuator is able to engage two parking locks simultaneously.

From an idealized perspective, a person looking at a schematic vehicle structure who has directed their gaze to the drive block along the longitudinal vehicle direction sees a flat projection of the components of the drive block within the outline of the vehicle, wherein, due to the sequence of the components along the vehicle longitudinal direction, the components arranged closer to the viewer may at least partially overlap these other components, i.e., the components arranged further away from the viewer. The two electric machines of the drive block are arranged one after the other along the longitudinal vehicle direction so that only part of the outlines can be seen in a projection of the outlines of the electric machines because these overlap, so that the surface areas enclosed by the outlines (in said projection) are at least partially congruent with each other. If a conceptual abstract view is not just flat, but rather spatial, i.e., if the spatial dimension along the longitudinal vehicle direction is added, then it is possible to speak of a partially aligned arrangement of the electric machines along the longitudinal vehicle direction, especially in such a case. In one embodiment, the overlap constitutes at least 30%, preferably at least 50%, of the cross-sectional area of each of the two electric machines. The electric machines may be at a minimum distance from each other along the longitudinal vehicle direction. A minimum distance of e.g., two centimeters enables improved cooling of the electric machines due to all-round air circulation.

In other words, the present invention presents a drive block of an electric motor-driven motor vehicle drive, which advantageously offers two wheel drives. Each of the two wheel drives can be driven by a separate electric machine, i.e., by a first electric machine and by a second electric machine. The drive block includes further components, such as e.g., an inverter block and such as e.g., if necessary, a parking lock device. The devices may be situated on different sides of a structural plane defined through centers of rotation of the electric machines.

The above-described arrangement of the individual components of a drive block has numerous advantages. The more sensitive components, such as e.g., the inverters, are taken out of the greatest danger zone. Stone chips and other mechanical impulses can cause significantly less damage to the housings of the electric machines than to the housings of the inverters, which due to the higher position chosen can be of more delicate design.

One very particular advantage results from the fact that laboriously developed motor vehicles with their long development times for bodies can continue to be used. Such motor vehicles can optionally be equipped with an internal combustion engine or with one of the drive blocks outlined above.

BRIEF DESCRIPTION OF THE DRAWINGS

The present invention can be better understood by referencing the accompanying figures, which show examples of particularly advantageous embodiments without limiting the present invention thereto.

DETAILED DESCRIPTION

Figure 1:
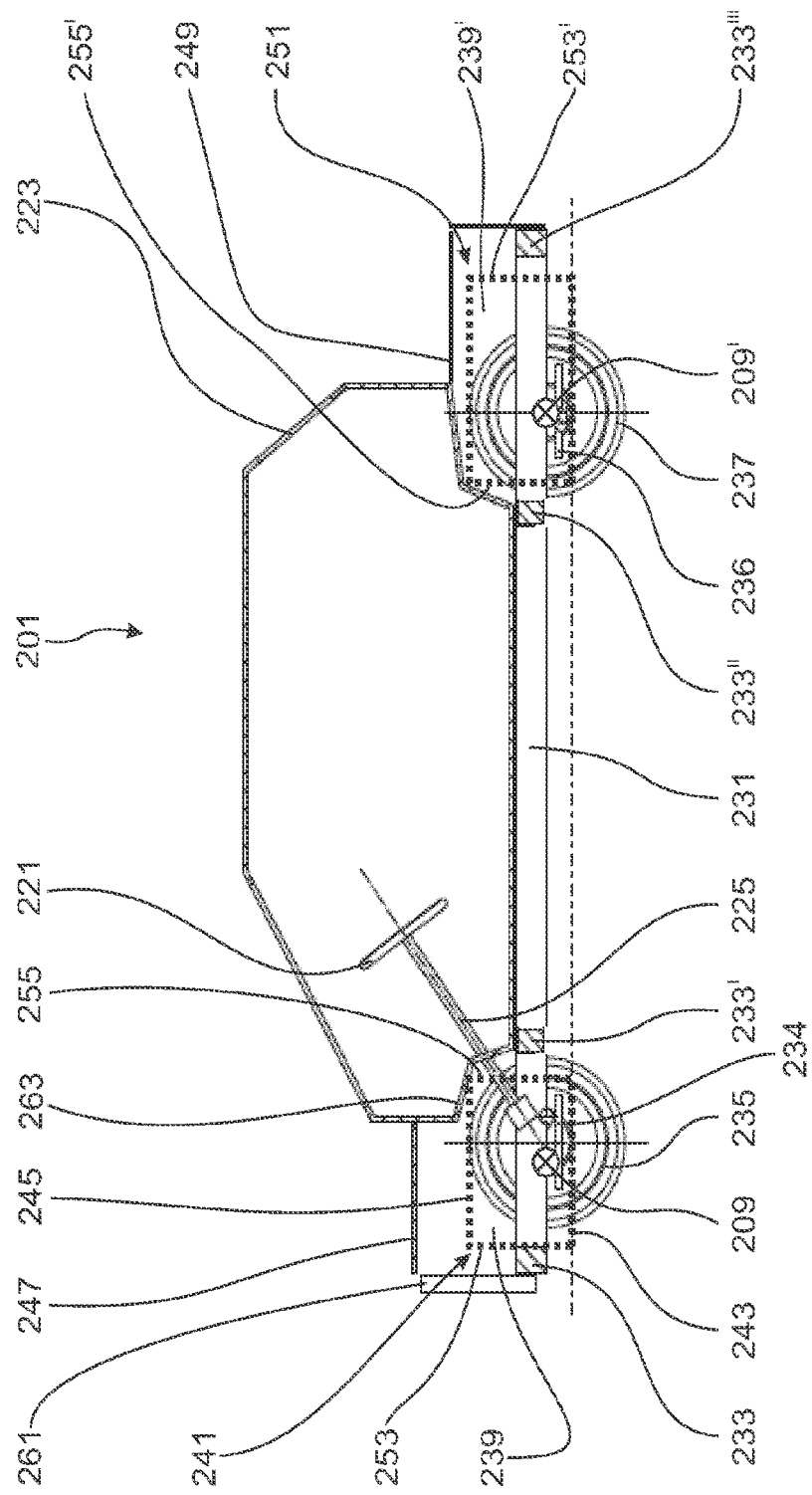
FIG. 1 schematically shows a first embodiment of a motor vehicle for accommodating a drive block according to one embodiment of the invention, in a view from one side.
Figure 2:
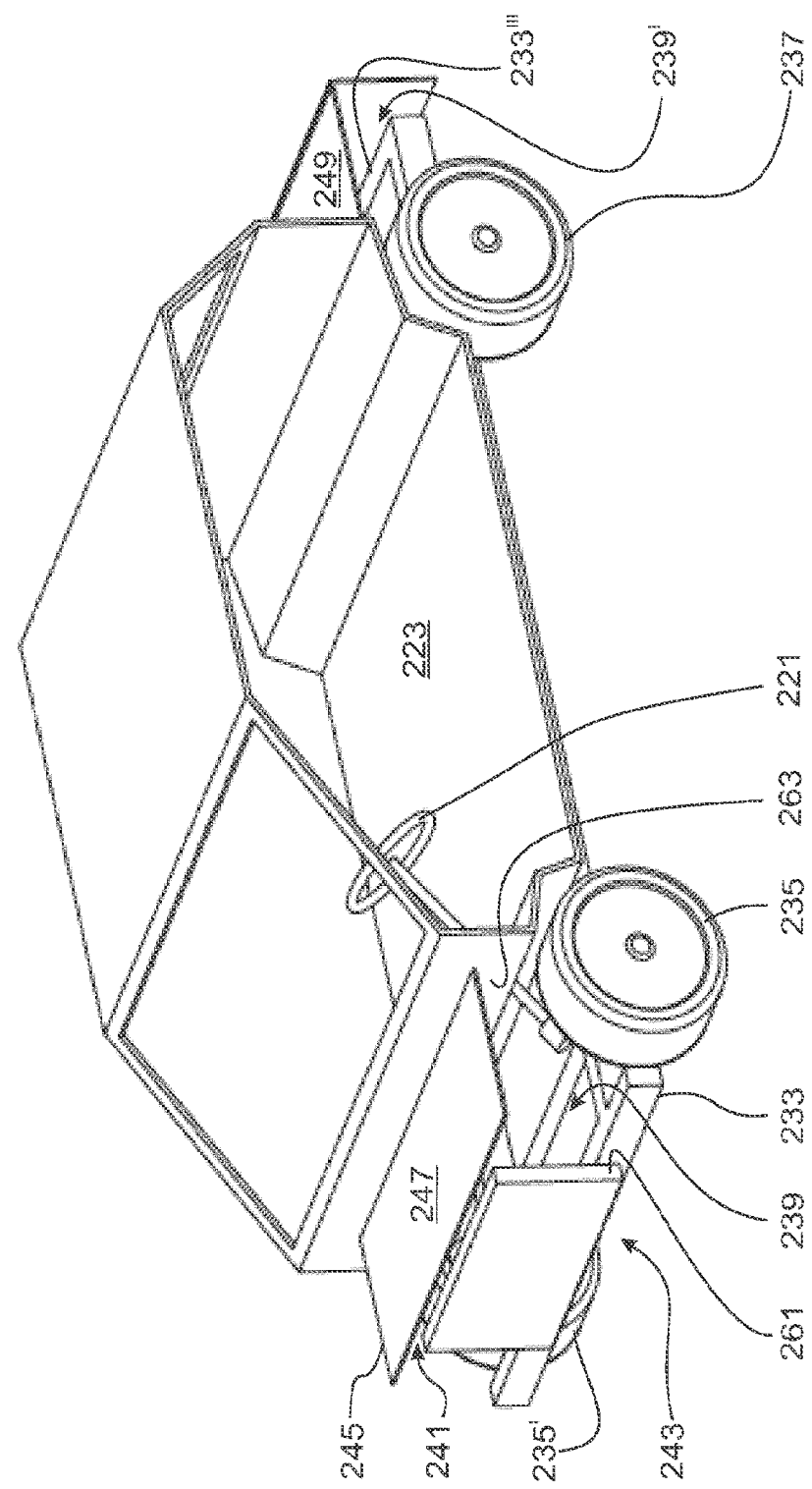
FIG. 2 shows the first embodiment of the motor vehicle according to FIG. 1 in a schematic 3D representation.
Figure 3:
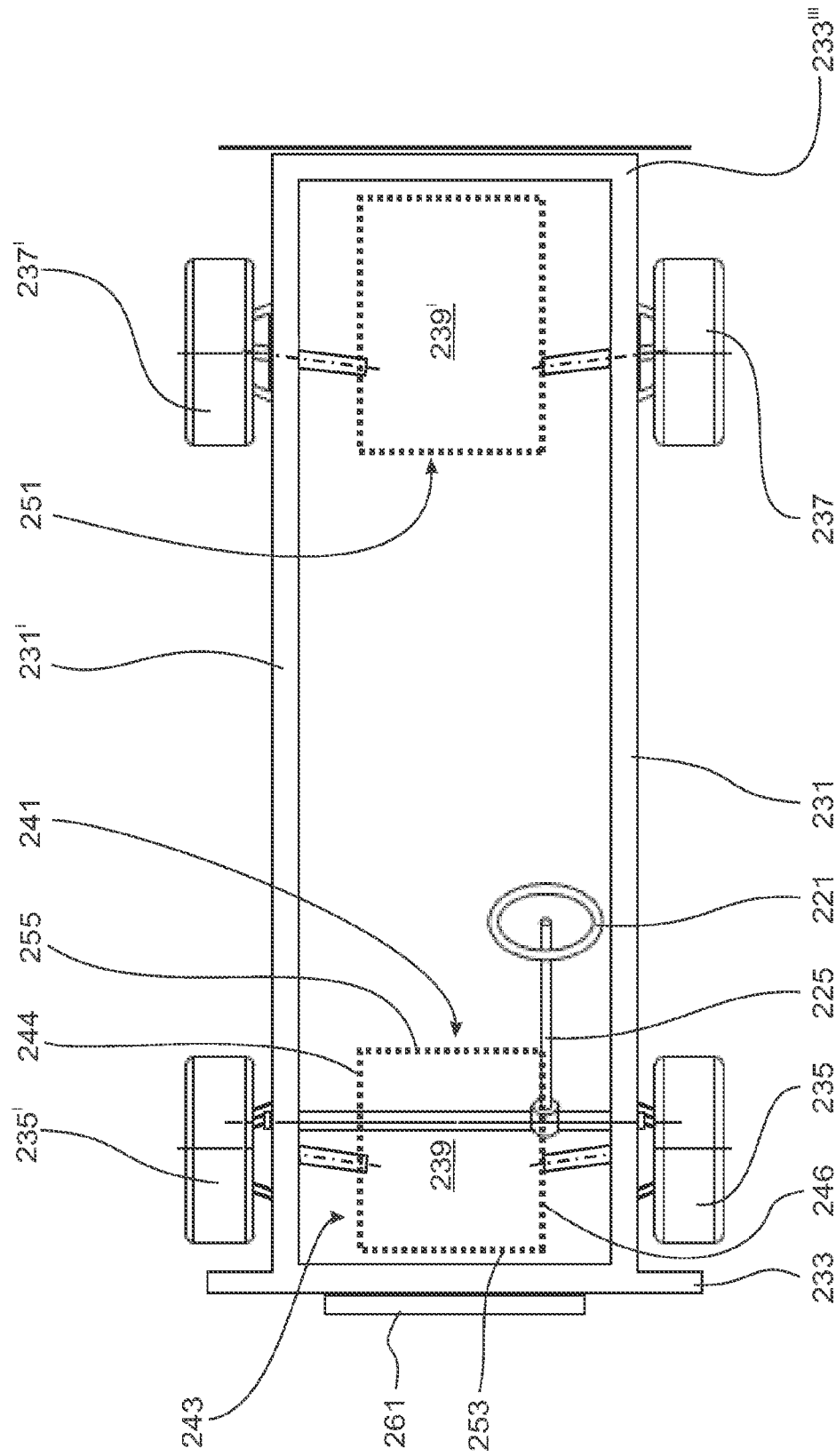
FIG. 3 schematically shows the first embodiment of the motor vehicle according to FIG. 1 in a sectional view from above.

FIG. 1 schematically shows a motor vehicle 201. FIGS. 2 and 3 show the motor vehicle 201 from two other viewing angles on the basis of the selected components. For the sake of clarity, the components shown have been selected so as not to overload the figures.

As can be seen from FIG. 1, the motor vehicle 201 has a passenger compartment 223, in which a driver of the motor vehicle 201 can be located and can act on the steering linkage 225 via the steering wheel 221 in order to change a direction of the motor vehicle 201.

Two installation spaces 239, 239$^I$ are shown in an abstract manner. One installation space 239 extends in front of the passenger compartment 223, i.e., in the front region of the motor vehicle 201, with the installation space 239 in part also extending underneath a front region of the passenger compartment 223. The other installation space 239$^I$ extends behind the passenger compartment 223, i.e., in the rear region of the motor vehicle 201, with the installation space 239$^I$ already starting beneath the passenger compartment 223.

The installation spaces 239 and 239$^I$ are located beneath a hood 247, which can also be referred to as a front flap, or beneath a trunk lid 249, which can also be referred to as a rear flap.

The installation space 239, 239$^I$ coincides with the axles 209, 209$^I$. In other words, the installation space 239, 239$^I$ is located where the axle 209, 209$^I$ also passes through the motor vehicle 201 in the motor vehicle transverse direction 213 (for the motor vehicle transverse direction 213, see in particular FIG. 4). The installation space 239, 239$^I$ available in each case is bounded by the side-members, such as the side-member 231, and by the cross-members, such as the cross-members 233, 233$^I$, 233$^{II}$, 233$^{III}$. An installation space 239, 239$^I$ is located between the front wheels 235 or the rear wheels 237.

The passenger compartment 223 is thus located above the side-members, such as the side-member 231, and the cross-members, such as the cross-members 233, 233$^I$, 233$^{II}$, 233$^{III}$. The front installation space 239 is defined and bounded by its installation space boundary 241. The rear installation space 239$^I$ is likewise bounded by its installation space boundary 251.

The front installation space 239 thus extends in a region beneath the hood 247. The rear installation space thus extends in a region beneath the trunk lid 249.

The tubular installation space boundary 241, which is formed by four lateral boundaries, is composed of a lower installation space boundary 243, an upper installation space boundary 245, a front installation space boundary 253 and a rear installation space boundary 255. The maximum area available, i.e., the maximum possible volume for a drive block (see e.g., the drive block 1 in FIG. 4), extends between the opposite installation space boundaries 243, 245 and 253, 255.

The front installation space boundary 253 is formed by a radiator 261 and by a first cross-member 233. The rear installation space boundary 255 is formed by a separating wall 263 of the passenger compartment 223.

The rear installation space 239$^I$ has boundary surfaces 253$^I$, 255$^I$ which form part of the installation space boundary 251 and which are arranged as a mirror image compared to the front installation space 239 because the front region thereof is located behind and partially underneath the passenger compartment 223 and the rear region thereof is located close to the rearmost cross-member 233$^{III}$.

By supplementing FIG. 1 with FIGS. 2 and 3, it is particularly clear to see how an installation space 239, 239$^I$ extends between the wheels 235, 235$^I$ or 237, 237$^I$ and between the side-members 231, 231$^I$. Hereinbelow, therefore, FIG. 1 will be discussed together with FIGS. 2 and 3.

The installation space boundaries 241, 251 of the installation spaces 239, 239$^I$ are located outside the passenger compartment 223 and between the wheels 235, 235$^I$ or 237, 237$^I$ of the respective axle 209, 209$^I$. An installation space boundary in the upward direction is formed by the passenger compartment 223, which must be large enough that a driver in a seated position can turn the steering wheel 221 and thus adjust, via the steering linkage 225, the angle of the road wheels 235, 235$^I$ to be controlled. Viewed from above, at least a portion of the installation spaces 239, 239$^I$ is located beneath a flap 247, 249, thereby facilitating access for maintenance work. A further boundary for the installation spaces 239, 239$^I$ is formed by the cross-members 233, 233$^{III}$ and the side-members 231, 231$^I$. As already stated, the installation space boundary 241 is composed of a lower installation space boundary 243, an upper installation space boundary 245, and four lateral installation space boundaries 244, 246, 253, 255, which can be considered in an abstract form as planar boundary surfaces. These boundary surfaces, when all taken together, form the cuboidal installation space boundary 241. Two lateral installation space boundaries 244, 246 face toward the wheels 235, 235$^I$. The lateral installation space boundaries 244, 246 are defined by triangular wishbones, such as the triangular wishbone 234 (front) for the installation space boundary 241 of the front installation space 239 and the triangular wishbone 236 (rear) for the installation space boundary 251 of the rear installation space 239$^I$ (see FIG. 1). Such wishbone arrangements are present in the motor vehicle 201 not only on the left-hand side, but also on the right-hand side (not visible in the selected views). A front installation space boundary 253 extends along an inner side of the radiator 261 or of a frame for absorbing collision energy. A rear installation space boundary 255 is located in front of the separating wall 263 to the passenger compartment 223. The installation space boundary 241, 251 is thus defined in particular by the circumjacent components of the motor vehicle 201. The lower installation space boundary 243, the upper installation space boundary 245 and the four lateral installation space boundaries 244, 246, 253, 255 can be numbered as boundary surfaces in any order (first, second, etc.). As will become apparent from the other embodiments, which installation space boundary 243, 244, 245, 246, 253, 255 becomes the first installation space boundary depends on the direction in which the motor vehicle drive 203, 203$^I$ is installed (see FIGS. 4 and 7).

The installation space boundary 251 in the rear region of the motor vehicle 201 is composed of the boundary surfaces in the manner of a mirror image of the installation space boundary 241 in the front region of the vehicle 201, but the larger boundary surfaces lead to a larger volume being available for a drive unit such as the drive block 1.

As can be seen from FIG. 1, the boundary surfaces 244, 246, 253, 255 of the installation space may also have at least one gradation. In this way, use can be made of otherwise dead spaces in the motor vehicle, such as e.g., in the motor vehicle 201 shown in FIG. 1. The possible installation space is used in a particularly space-efficient manner and is filled by a suitable drive block, such as the drive block 1 shown in FIG. 1.

Figure 4:
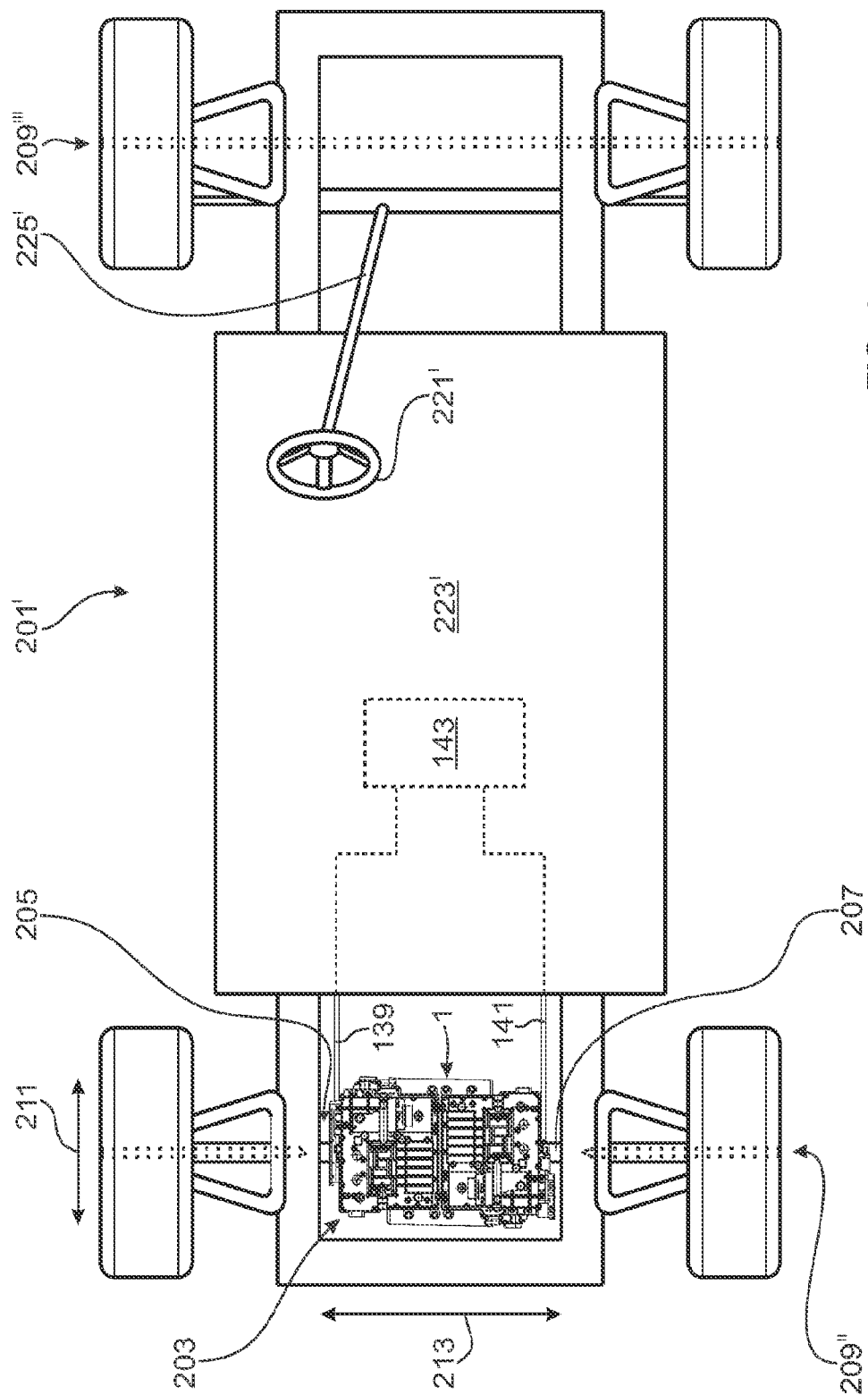
FIG. 4 schematically shows another embodiment of a motor vehicle with a drive block.

The installation space boundaries 241, 251 define in each case a maximum receiving volume for installation of a drive block (cf. drive block 1 shown in FIG. 4). In other words, differently configured drive blocks (cf. FIGS. 8 to 24) are particularly suitable for installation in a motor vehicle (cf. the motor vehicles 201 shown in FIGS. 1 and 201' shown in FIG. 4), depending on the structural and safety-related installation space boundaries 241, 251. Advantages for one or the other configuration in accordance with FIGS. 8 to 24 are thus achieved, depending on the installation space boundaries 241, 251.

FIG. 4 schematically shows a motor vehicle 201$^I$ with a drive block 1 according to the invention. The drive block 1 forms part of the motor vehicle drive 203. Also forming part of the motor vehicle drive 203 is the electrical energy store 143, which is connected to the drive block 1 via cables, such as the power supply cable 139 and the power supply cable 141.

The drive block 1 is a single-wheel drive 205$^I$, 207$^I$ which can drive two single (road) wheels via its two independently operating single-wheel drives 205, 207, i.e., first single-wheel drive 205 and second single-wheel drive 207. The two single-wheel drives 205, 207 are located on the same axle 209$^{II}$, which in the exemplary embodiment shown in FIG. 4 is the rear axle of the motor vehicle 201$^I$ (e.g., of a typical sports car driven on the rear axle).

In another embodiment, which is not shown in the drawings, the single-wheel drives can be located on the front axle, see for example the axle 209 in FIG. 1. Other possible embodiments have single-wheel drives on the rear axle as a first common axle and on the front axle as a second common axle. It is thus also possible to implement, according to the invention, such axle arrangements in which a plurality of individually driven axles are present, for example, in the rear region of the vehicle. Considered individually, each axle is an axle that can be referred to as a common axle, which can be equipped with two single-wheel drives.

Based on the passenger compartment 223$^I$ and the arrangement of the steering wheel 221' on the steering linkage 225$^I$, it is clear in FIG. 4 that the single-wheel drive 205$^I$, 207$^I$ is a rear-axle drive in the exemplary embodiment shown in FIG. 4. The drive block 1$^I$ is installed transversely, as can be seen with reference to the motor vehicle transverse direction 213. The drive block 1' is narrower in the longitudinal direction than in the transverse direction, as can be seen by comparing the extent of the drive block 1' in the longitudinal vehicle direction 211 with the extent in the motor vehicle transverse direction 213.

The axles 209$^{II}$, 209$^{III}$ are indicated by dotted lines in FIG. 4. The axles 209$^{II}$, 209$^{III}$ are design aids or memory aids illustrating the arrangement of the road wheels of the motor vehicle 201$^I$.

In the design example shown in FIG. 4, the road wheels are attached by means of a respective single-wheel suspension, which forms a movable connection between a vehicle body (no reference sign), which encompasses the passenger compartment 223$^I$, and the respective road wheel. In other words, the axles 209$^{II}$, 209$^{III}$ are recognizable by guide elements of the wheels, such as on the basis of single-wheel suspensions, e.g., the triangular suspensions shown in the drawings, but also on the basis of the steering knuckles, on the basis of a swing axle, on the basis of a trailing link axle, on the basis of a semi-trailing link axle, on the basis of a multi-link axle, on the basis of a portal axle, on the basis of a rigid axle or on the basis of composite suspensions according to other possible embodiments not shown in detail in the drawings.

Figure 5:
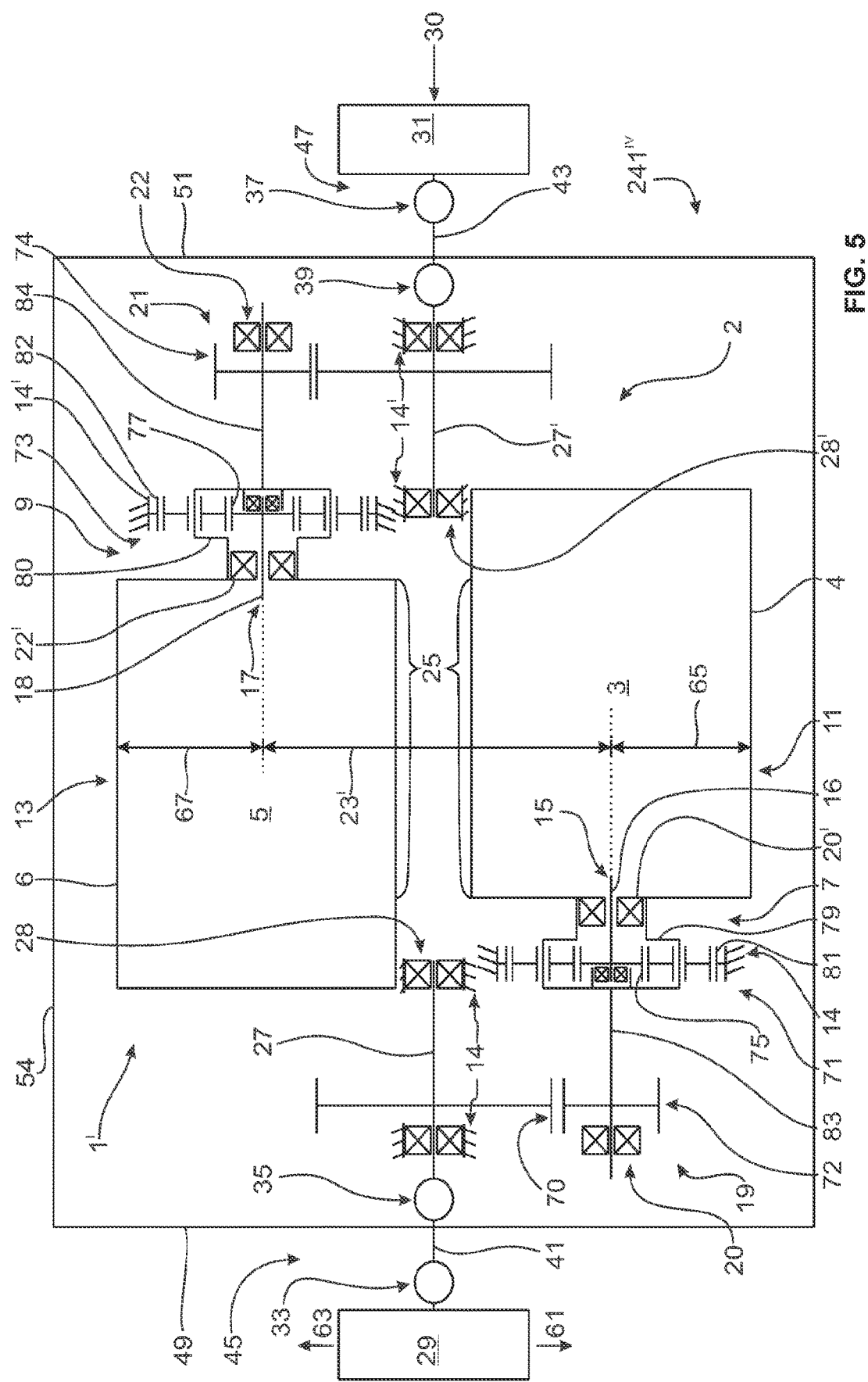
FIG. 5 schematically shows a first detailed axle arrangement of a pure single-wheel drive.

FIG. 5, which will be described in greater detail below, shows one possible transmission scheme for a blocked single-wheel drive of a drive block 1$^I$, which can be implemented within the installation space boundaries 241, 243, 244, 245, 246, 251, 253, 253$^I$, 255, 255$^I$ outlined in FIGS. 1 to 4. The transmission schemes derived from the transmission scheme shown in FIG. 5, which lead to the drive blocks 1$^{II}$ and 1$^{III}$ shown in FIGS. 6 and 7, can likewise be arranged within an installation space that observes the installation space boundaries 241, 243, 244, 245, 246, 251, 253, 253$^I$, 255, 255$^I$.

The transmission scheme shown in FIG. 6, which will be explained after FIG. 5, enables all the transmission components to be arranged next to each other in as compact a manner as possible for a single-wheel drive, so as to create an extremely compact drive block 1$^{II}$.

Figure 6:
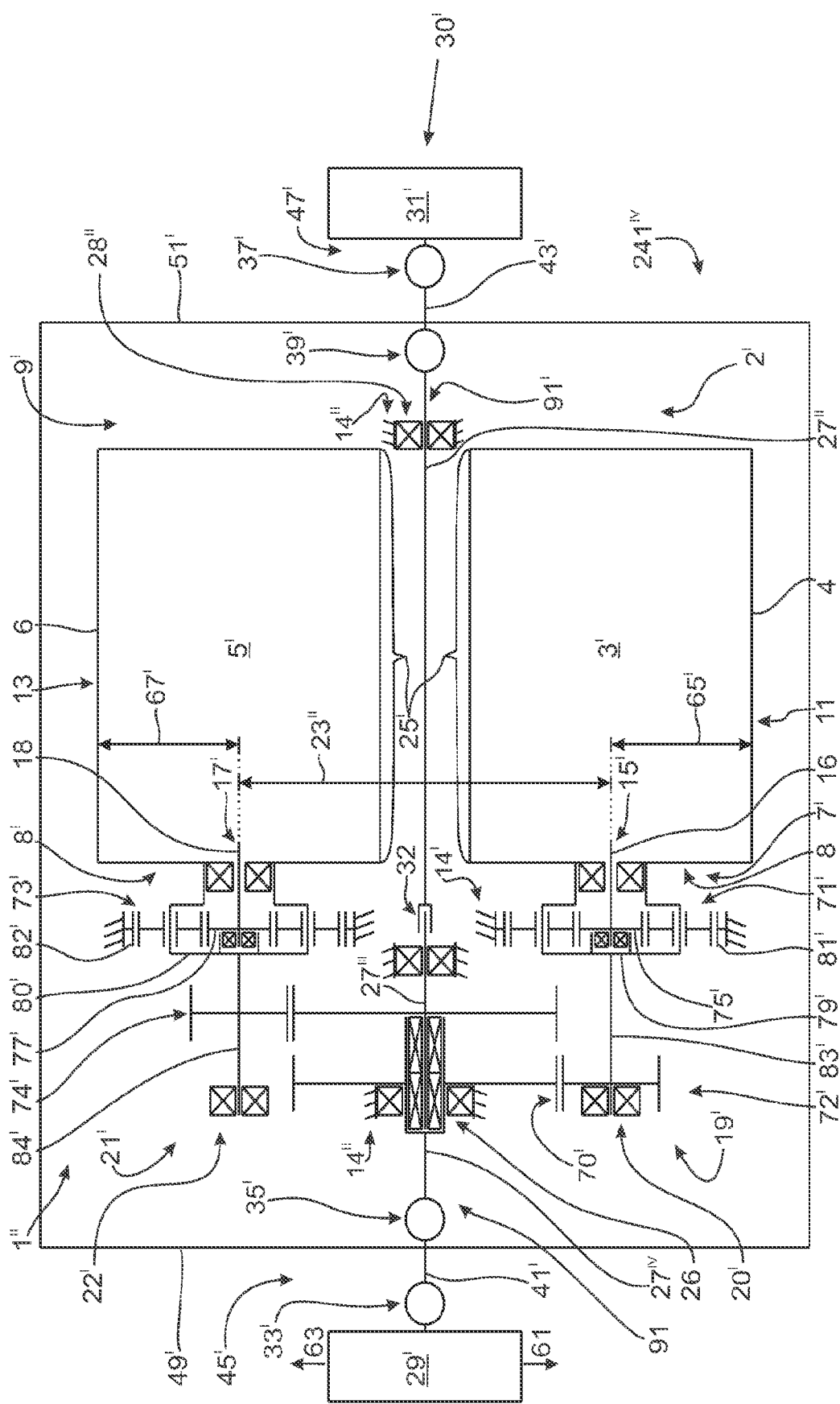
FIG. 6 schematically shows a second detailed axle arrangement of a single-wheel drive on a common axle.

In another embodiment (not shown in detail), based on an arrangement according to FIG. 6, the electric motor drive of both electric machines 3$^I$, 5$^I$ can be coupled to the two road wheels 29$^I$, 31$^I$ of the common axle 30$^I$, and separated again, by means of a switching unit between the transmissions 19$^I$, 21$^I$. The common coaxial bearing 26 is replaced by a switching group which can lock together the two output shaft segments 27$^{IV}$ and 27$^{III}$. This makes it possible to increase the drive power to one of the road wheels when ground conditions are difficult. In addition, such a motor vehicle remains drivable even though one of the electric motors might have failed.

Figure 7:
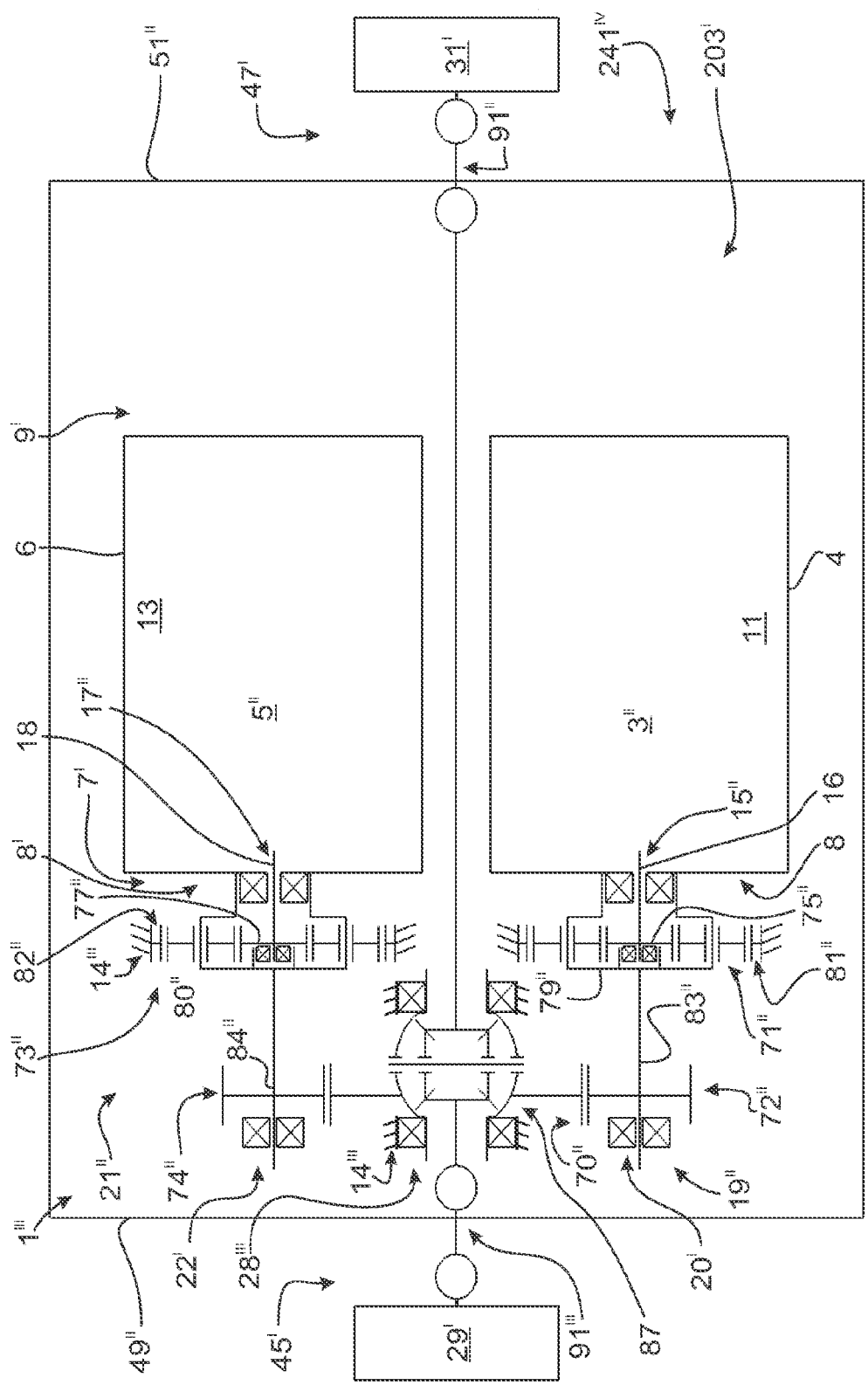
FIG. 7 schematically shows a third detailed axle arrangement, which can be used as an axle drive.

In the further embodiment of a transmission scheme shown in FIG. 7, the electromotive drive torques of the two electric machines 3$^{II}$, 5$^{II}$ are distributed between the two road wheels 29$^I$, 31$^I$ via a differential 87. A drive is thus always maintained, even if one of the electric machines 3$^{II}$, 5$^{II}$ fails.

Of course, it is also possible to combine switching units according to FIG. 6 and differentials according to FIG. 7 in order to create, from a single-wheel drive 2 shown in FIG. 5, an overall drive that can be switched to act as an axle drive.

In FIGS. 5 to 16, installation space boundaries 241$^I$, 241$^{II}$, 241$^{III}$, 241$^{IV}$ for the individual drives (cf. drive 203 in FIG. 4, cf. single-wheel drive 2 in FIG. 5 or single-wheel drive 2$^I$ in FIG. 6, cf. motor vehicle drive 203$^I$ in FIG. 7) are illustrated by rectangular boxes. These arrangements can be transferred in mirror-image form to an installation space which exists in the rear part of the vehicle and which is bounded by a rear installation space boundary 251 (see FIG. 1). In other words, even though FIGS. 1 to 16 focus on installation in a front installation space 241, 241$^I$, 241$^{II}$, 241$^{III}$, 241$^{IV}$ of a motor vehicle, such as the motor vehicle 201 according to FIG. 1, the drives shown, such as the drive 203 shown in FIG. 4, can also be installed in a rear installation space, such as the installation space 251 (shown in FIG. 1). The boundaries that define the installation space boundary surfaces 243, 243$^I$, 243$^{II}$, 243$^{III}$, 244, 244$^I$, 244$^{II}$, 244$^{III}$, 245, 245$^I$, 245$^{II}$, 245$^{III}$, 246, 246$^I$, 246$^{II}$, 246$^{III}$, which are predominantly set at right angles, are observed by the drive blocks 1$^I$, 1$^{II}$, 1$^{III}$, 1$^{IV}$, 1$^V$, 1$^{VI}$, 1$^{VII}$, 1$^{VIII}$, 1$^{IX}$, 1$^X$, 1$^{XI}$, 1$^{XII}$, which are shown schematically in FIGS. 5 to 16, and by the drive blocks 1$^{XIII}$, 1$^{XIV}$, 1$^{XV}$, 1$^{XVI}$, 1$^{XVII}$ shown in FIGS. 17 to 24, while making the best possible use of the space available.

The schematic diagrams which are shown in FIGS. 5, 6 and 7 and which illustrate drives with two motors 3, 5, 3$^I$, 5$^I$, 3$^{II}$, 5$^{II}$ for road wheels on one axle (single-wheel drives and axle drives) will be discussed in greater detail below.

FIG. 5 shows the electric machines 3, 5 oriented in opposite directions. The running direction of the electric machines 3, 5 is reversible by means of a control unit (not shown). In FIGS. 5 and 7, the electric machines 3$^I$, 5$^I$, 3$^{II}$, 5$^{11}$ are to be operated in pairs and should always be operated in the same direction or in a manner rotating in the same direction of rotation.

The maximum installation space available for the drive block 1$^I$ according to FIG. 5 or for the drive block 1$^{II}$ according to FIG. 6 or for the drive block $1^{III}$ according to FIG. 7 becomes particularly clear when each of FIGS. 5, 6 and 7 is considered together with FIGS. 1 to 4. The installation space results from a clearance between a first edge reinforcement, in particular a left spar 49, $49^I$, $49^{II}$, which can be seen in particular in FIGS. 5, 6 and 7, and a second edge reinforcement, in particular a right spar 51, $51^I$, $51^{II}$, which can likewise be seen in FIGS. 5, 6 and 7.

To make the diagram clearer, the housing parts of the housing 14, $14^I$, $14^{II}$, $14^{III}$ of the drive block $1^I$, $1^{II}$, $1^{III}$ have been shown only symbolically in the diagrams of FIGS. 5 to 7. In addition, the controllers of the electric machines 3, $3^I$, $3^{II}$, 5, $5^I$, $5^{II}$ have been omitted in the diagrams of FIGS. 5 to 7 with the intention being to increase clarity.

Provided to the side of the drive block $1^I$, $1^{II}$, $1^{III}$ are a first road wheel, in particular in the form of a drive wheel 29, $29^I$, and a second road wheel, in particular in the form of a drive wheel 31, $31^I$, the direction of rotation of which gives a direction of travel 61, 63 of a vehicle (cf. motor vehicle 1 shown in FIG. 1) carrying the drive unit $1^I$, $1^{II}$, $1^{III}$. Electric machines 3, $3^I$, $3^{II}$, 5, $5^I$, $5^{II}$ are installed in the motor vehicle, e.g., the motor vehicle 1 shown in FIG. 1, transversely to the direction of travel 61, 63.

A first electric machine 3, $3^I$, $3^{II}$ having a first electrical region 11 is present in FIG. 57. The first electric machine 3, $3^I$, $3^{II}$ has a first drive axle 15, $15^I$, $15^{II}$. A second electric machine 5, $5^I$, $5^{II}$ has a second electrical region 13. The second electric machine 5, $5^I$, $5^{II}$ is operatively connected to a second drive axle 17, $17^I$, $17^{II}$. The electric machines 3, $3^I$, $3^{II}$, 5, $5^I$, $5^{II}$ have a rotor arrangement which is rotatable in a stator arrangement mounted on the vehicle or on the transmission housing. Torque is thus generated by means of electric fields generated by current in windings. The first drive axle 15, $15^I$, $15^{II}$ and the second drive axle 17, $17^I$, $17^{II}$ extend in particular parallel to each other and are at a distance $23^I$, $23^{II}$ from each other (see FIGS. 5 and 6), preferably at right angles to an axle extension direction. The distance $23^I$, $23^{II}$ is greater than a stator diameter when measured at right angles to the axle extension direction. In other words, the distance $23^I$, $23^{II}$ is greater than a sum of the first stator radius 65, $65^I$ of the first electric machine 3, $3^I$ and the second stator radius 67, $67^I$ of the second electric machine 5, $5^I$, the radius measurement preferably being determined in each case as an external dimension, i.e., including the housings 4, 6 of the electric machines 3, 5, as shown in FIG. 5. The distance $23^I$, $23^{II}$ is smaller than a track width between the two drive wheels 29, 31 or $29^I$, $31^I$ (see FIGS. 5 and 6), said track width being transverse to the distance $23^I$, $23^{II}$. An input sun gear 75, $75^I$, $75^{II}$, 77, $77^I$, $77^{II}$ arranged on the drive axles 15, $15^I$, $15^{II}$, 17, $17^I$, $17^{II}$ is driven by the electric machines 3, $3^I$, $3^{II}$, 5, $5^I$, $5^{II}$. The first input sun gear 75, $75^I$, $75^{II}$ is part of the first transmission 19, $19^I$, $19^{II}$ The second input sun gear 77, $77^I$, $77^{II}$ is part of the second transmission 21, $21^I$, $21^{II}$. The first transmission 19, $19^I$, $19^{II}$ comprises a first planetary transmission 71, $71^I$, $71^{II}$ and a first output gear stage 72, $72^I$, $72^{II}$, wherein the output gear stage 72, $72^I$, $72^{II}$ is also characterized by its gear pair. The second transmission 21, $21^I$, $21^{II}$ comprises a second planetary transmission 73, $73^I$, $73^{II}$ and a second output gear stage 74, $74^I$, $74^{II}$, wherein the second output gear stage 74, $74^I$, $74^{II}$ can be characterized on the basis of its gear pair. The two planetary transmissions 71, $71^I$, $71^{II}$, 73, $73^I$, $73^{II}$ respectively comprise the input sun gears 75, $75^I$, $75^{II}$, 77, $77^I$, $77^{II}$, a first carrier 79, $79^I$, $79^{II}$ or second carrier 80, $80^I$, $80^{II}$ having a plurality of planet gears, and a first ring gear 81, $81^I$, $81^{II}$ or second ring gear 82, $82^I$, $82^{II}$. These ring gears 81, $81^I$, $81^{II}$, 82, $82^I$, $82^{II}$ are fixed to the transmission housing 14, $14^I$, $14^{II}$, $14^{III}$. The transmissions 19, $19^I$, $19^{II}$, 21, $21^I$, $21^{II}$ each have, on the drive axles 15, $15^I$, $15^{II}$, $15^{IV}$, 17, $17^I$, $17^{II}$, a roller bearing arrangement 20, 22 with three roller bearings (see FIG. 5). A first roller bearing $20^I$, $22^I$ supports the first carrier 79, $79^I$, $79^{II}$ or second carrier 80, $80^I$, $80^{II}$ on the first electric machine housing 4 or on the second electric machine housing 6, respectively. A rotor-driven drive shaft 16, 18 of the respective electric machine 3, $3^I$, $3^{II}$, 5, $5^I$, $5^{II}$ rotates the input sun gear 75, $75^I$, $75^{II}$, 77, $77^I$, $77^{II}$ A torque is transmitted from the input sun gear 75, $75^I$, $75^{II}$, 77, $77^I$, $77^{II}$, via the carrier 79, $79^I$, $79^{II}$, 80, $80^I$, $80^{II}$, to a respective intermediate shaft 83, $83^I$, $83^{II}$, 84, $84^I$, $84^{II}$ connected to the carrier 79, $79^I$, $79^{II}$, 80, $80^I$, $80^{II}$. Via the gear pair 70, $70^I$, $70^{II}$ of the output gear stage 72, $72^I$, $72^{II}$ (see FIGS. 5, 6 and 7), the intermediate shaft 83, $83^I$, $83^{II}$ drives the respective output shaft 27, 91, $91^{II}$, $91^{III}$ or the output shaft segment $27^{IV}$. As shown in FIG. 7, the output shafts 91, $9^{III}$ are driven via a differential 87 arranged downstream of the output gear stage $72^{II}$. The Output shafts 27, $27^I$, 91, $91^I$, $91^{II}$ or the output shaft segments $27^{II}$, $27^{III}$, $27^{IV}$ are guided or supported in an output shaft roller bearing arrangement 28, $28^I$, $28^{II}$, $28^{III}$ on the transmission housing 14, $14^I$, $14^{II}$, $14^{III}$. The output shaft roller bearing arrangement 28, $28^I$, $28^{II}$ is a co-linear arrangement around a common axle, which can also be referred to as the driven axle 30, $30^I$. The output shaft roller bearing arrangement 28, $28^I$, $28^{II}$ is offset with respect to the roller bearing arrangement 20, 22 of the drive axles 15, $15^I$, $15^{II}$, 17, $17^I$, $17^{II}$. The installation space available can thus be used particularly efficiently.

A torque can be transmitted via the output shaft 27, $27^I$, 91, $91^I$, $91^{II}$, $9^{III}$ or the output shaft segments $27^{II}$, $27^{III}$, $27^{IV}$. The torque passes via a first joint 33, $33^I$ and a second joint 35, $35^I$ to the first road wheel 29, $29^I$. The first joint 33, $33^I$ and the second joint 35, $35^I$ are connected to each other via a first side shaft 41, $41^I$ (cardan shaft) and are thus part of a first single-wheel suspension 45, $45^I$. A third joint 37, $37^I$ is connected to a fourth joint 39, $39^I$ via a second side shaft 43, $43^I$, and these parts 37, $37^I$, 39, $39^I$, 43, $43^I$ can thus be referred to as components of a second single-wheel suspension 47, $47^I$.

Elements which are shown only schematically in connection with FIG. 7 and which are provided with reference signs in FIGS. 5 and 6 can be carried over to FIG. 7. The explanation of FIGS. 5 and 6 can also be carried over to the corresponding elements shown in FIG. 7.

The output shaft 27, $27^I$, 91 shown in FIGS. 5 and 6 is formed of at least two parts. Parts of the output shaft 91, $91^I$ are also referred to as output shaft segments $27^{II}$, $27^{III}$, $27^{IV}$.

As shown in the example of FIG. 5, a first output shaft 27 and a second output shaft $27^I$ are formed separately from each other. Both output shafts 27, $27^I$ are power-carrying shafts. The first output shaft 27 drives the first road wheel 29 because it transmits a torque from the first electric machine 3. The second output shaft $27^I$, which is arranged in a substantially co-linear manner with respect to the first output shaft 27, transmits the rotational movement or the torque from a second electric machine 5 to the second road wheel 31 via the third joint 37 and the fourth joint 39.

In the example shown in FIG. 6, the output shaft 91 has three segments $27^{II}$, $27^{III}$, $27^{IV}$. Two output shaft segments $27^{II}$, $27^{III}$ are coupled by means of a plug-in connection 32 to form a torque transmission unit. This can also be referred to as a power-transmitting unit. Located next to the non-rotatable plug-in connection 32 is a coaxial bearing 26, at which a decoupled introduction of torque from the output gear stages $72^I$, $74^I$ to the output shafts 91, $91^I$ is made possible for a single-wheel drive $2^I$. Among other things, this facilitates assembly. In addition, as also shown in FIG. 5, a first and a second single-wheel suspension 45, 47 is present. Both a first output side 7 and a second output side 9 are drivable separately from each other or independently of each other.

While in FIG. 5 the output sides 7, 9 can also be referred to as motor end faces, in FIGS. 6 and 7 only one of the output sides, the output side $7^I$, is located on a motor end face that faces toward the transmissions $19^I$, $19^{II}$, $21^I$, $21^{II}$. The other output side $9^I$ is located on a side of the electric machines $3^I$, $5^I$, $3^{II}$, $5^{II}$ that faces away from the end faces 8, $8^I$.

FIGS. 6 and 7 show single-wheel drives 2, $2^I$ (cf. drive 203 of FIG. 4). The drive $203^I$ of FIG. 7, which is a drive according to the invention, is a differential drive.

The drive unit $1^{III}$ shown in FIG. 7, which also includes the electric machines $3^{II}$, $5^{II}$, has an arrangement similar to the drive unit $1^{II}$ comprising the electric machines $3^I$, $5^I$ in FIG. 6. In a manner differing therefrom, however, the torque from the two electric machines $3^{II}$, $5^{II}$ in the drive unit $1^{III}$ is combined and is distributed between the first output shafts $91^I$, $91^{II}$ via a differential 87.

In another advantageous embodiment, which is based on FIG. 7 but is not shown in the drawings, a shaft switching element is provided, by means of which the first intermediate shaft can be decoupled from a hollow shaft or, in the decoupled state, can be coupled thereto. By means of the shaft switching element, one of the electric machines can be decoupled from the gear pair. The hollow shaft carries a first gear. The first gear forms a gear pair with a second gear, which is connected to the differential. When the drive unit is operated using only the second electric machine, the shaft switching element enables operation in a manner that is substantially free of drag torque in relation to the first electric machine and the planetary transmission thereof and is therefore more energy-efficient. When the second electric machine is driving the differential, the first electric machine can be switched on by actuating the shaft switching element. In the other switch position of the shaft switching element, the electric machine can be switched off. It is thus possible to operate just one electric machine, namely the second electric machine, while the first electric machine is off. If the electric machines belong to different performance classes, the shaft switching element, an identical one of which can also be installed in the train of the second electric machine, makes it possible to operate just one of the two electric machines and to (temporarily) switch off the electric machine that is not in the correct performance class.

The structural arrangement shown in FIGS. 5 to 7 results in a longer installation space for a coverage area or overlap area 25, $25^I$ (see FIGS. 5 and 6), in particular of the electric machines 3, $3^I$, $3^{II}$, 5, $5^I$, $5^{II}$.

As can also be seen from FIG. 5, a splash guard 54, which is formed by a floor plate, can be placed beneath the electric machines 3, 5.

FIGS. 8 to 16 show exemplary embodiments of drive blocks $1^{IV}$, $1^V$, $1^{VI}$, $1^{VII}$, $1^{VIII}$, $1^{IX}$, $1^X$, $1^{XI}$, $1^{XII}$, wherein the viewing direction for the diagrams is selected in each case from the same side along an output shaft $91^{IV}$, $91^V$, $91^{VI}$, with the aim of enabling an easier comparison.

FIGS. 8 to 16 each show a drive block $1^{IV}$, $1^V$, $1^{VI}$, $1^{VII}$, $1^{VIII}$, $1^{IX}$, $1^X$, $1^{XI}$, $1^{XII}$. The illustrated drive blocks $1^{IV}$, $1^V$, $1^{VI}$, $1^{VII}$, $1^{VIII}$, $1^{IX}$, $1^X$, $1^{XI}$, $1^{XII}$ are arranged in terms of volume such that the drive blocks $1^{IV}$, $1^V$, $1^{VI}$, $1^{VII}$, $1^{VIII}$, $1^{IX}$, $1^X$, $1^{XI}$, $1^{XII}$ have placed their components, such as e.g., the inverters 111, 113, within the predefined installation space boundary $241^I$, $241^{II}$, $241^{III}$. In the plane of the drawing in each of FIGS. 8 to 16, the installation space boundary $241^I$, $241^{II}$, $241^{III}$ is formed by a lower installation space boundary $243^I$, $243^{II}$, $243^{III}$, an upper installation space boundary $245^I$, $245^{II}$, $245^{III}$, a front boundary surface $253^I$, $253^{II}$, $253^{III}$ and a rear boundary surface $255^I$, $255^{II}$, $255^{III}$, the specification "front" and "rear" being defined by reference to a motor vehicle, such as e.g., the motor vehicle 201 according to FIG. 1 (it being possible to refer more generally to a first and a second boundary surface). The drive blocks $1^{IV}$, $1^V$, $1^{VI}$, $1^{VII}$, $1^{VIII}$, $1^{IX}$, $1^X$, $1^{XI}$, $1^{XII}$ each include a first inverter 111 and a second inverter 113 as well as two electric machines, such as the second electric machine $5^{III}$, $5^{IV}$, wherein, in the diagrams shown in FIGS. 8 to 16, a respectively present first electric machine is covered and therefore cannot be seen. Also belonging to a drive block $1^{IV}$, $1^V$, $1^{VI}$, $1^{VII}$, $1^{VIII}$, $1^{IX}$, $1^X$, $1^{XI}$, $1^{XII}$ are two transmissions, such as a first transmission $19^{III}$, $19^{IV}$ and a second transmission $21^{III}$, $21^{IV}$. The first transmission $19^{III}$, $19^{IV}$ is driven by the first electric machine, and the second transmission $21^{III}$, $21^{IV}$ is driven by the second electric machine $5^{III}$, $5^{IV}$. The transmissions $19^{III}$, $21^{III}$, $19^{IV}$, $21^{IV}$ are accommodated in sub-housings, such as the sub-housing $14^{IV}$, which are each terminated by an outer housing wall shell 10, $10^I$ (cf. FIG. 8). In the cross-sectional plane shown, a first rotary shaft, which is a drive shaft $16^I$, $16^{II}$, $16^{III}$, and a second rotary shaft, which is a drive shaft $18^I$, $18^{II}$, $18^{III}$ (the position of each of which is marked), form together with an output shaft $91^{IV}$, $91^V$, $91^{VI}$ a triangular configuration, wherein the shafts $16^I$, $16^{II}$, $16^{III}$, $18^I$, $18^{II}$, $18^{III}$, $91^{IV}$, $91^V$, $91^{VI}$ define the position of the corners of a triangle. This can also be referred to as a V-shaped arrangement 93, $93^I$, $93^{II}$ when starting from the output shaft $91^{IV}$, $91^V$, $91^{VI}$ and assigning a first leg or first arm 95, $95^I$, $95^{II}$ to the first rotary shaft (drive shaft $16^I$, $16^{II}$, $16^{III}$) and assigning a second leg or arm 97, $97^I$, $97^{II}$ to the second rotary shaft (drive shaft $18^I$, $18^{II}$, $18^{III}$). Between the two arms 95, $95^I$, $95^{II}$, 97, $97^I$, $97^{II}$, there is an angle 99, $99^I$, $99^{II}$.

Figure 8:
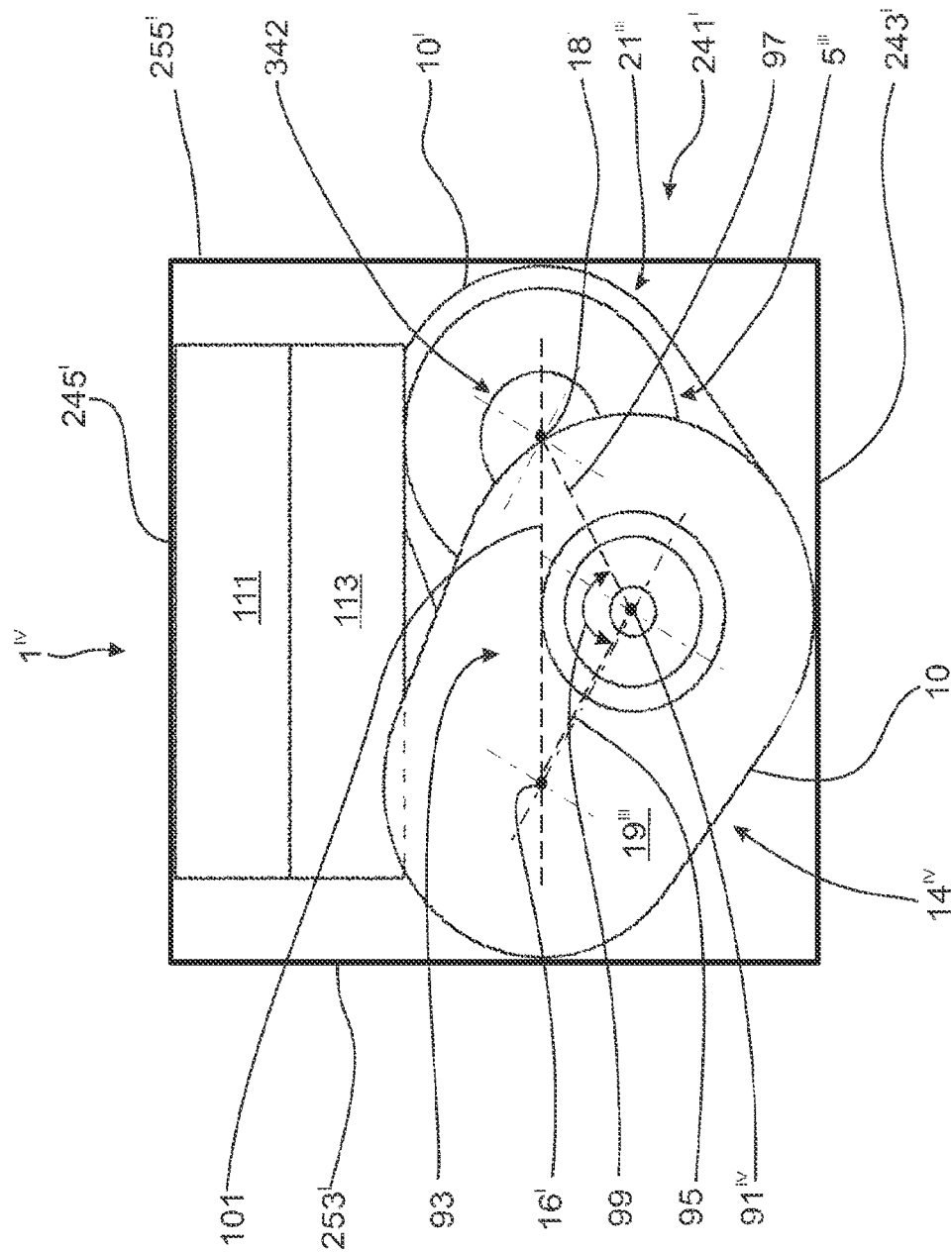
FIG. 8 schematically shows a fourth embodiment of a drive block.

As shown in FIG. 8, this angle 99 opens toward the inverters 111, 113. This can also be seen in FIGS. 9, 10, 11 and 12. The rotary shafts $16^I$, $18^I$, which run through the plane of the drawing in FIG. 8, also define a structural plane 101 which extends parallel to the stacked inverters 111, 113. The structural plane 101 shown in FIG. 8 can also be defined in all the exemplary embodiments shown in FIGS. 9, 10, 11 and 12.

Figure 9:
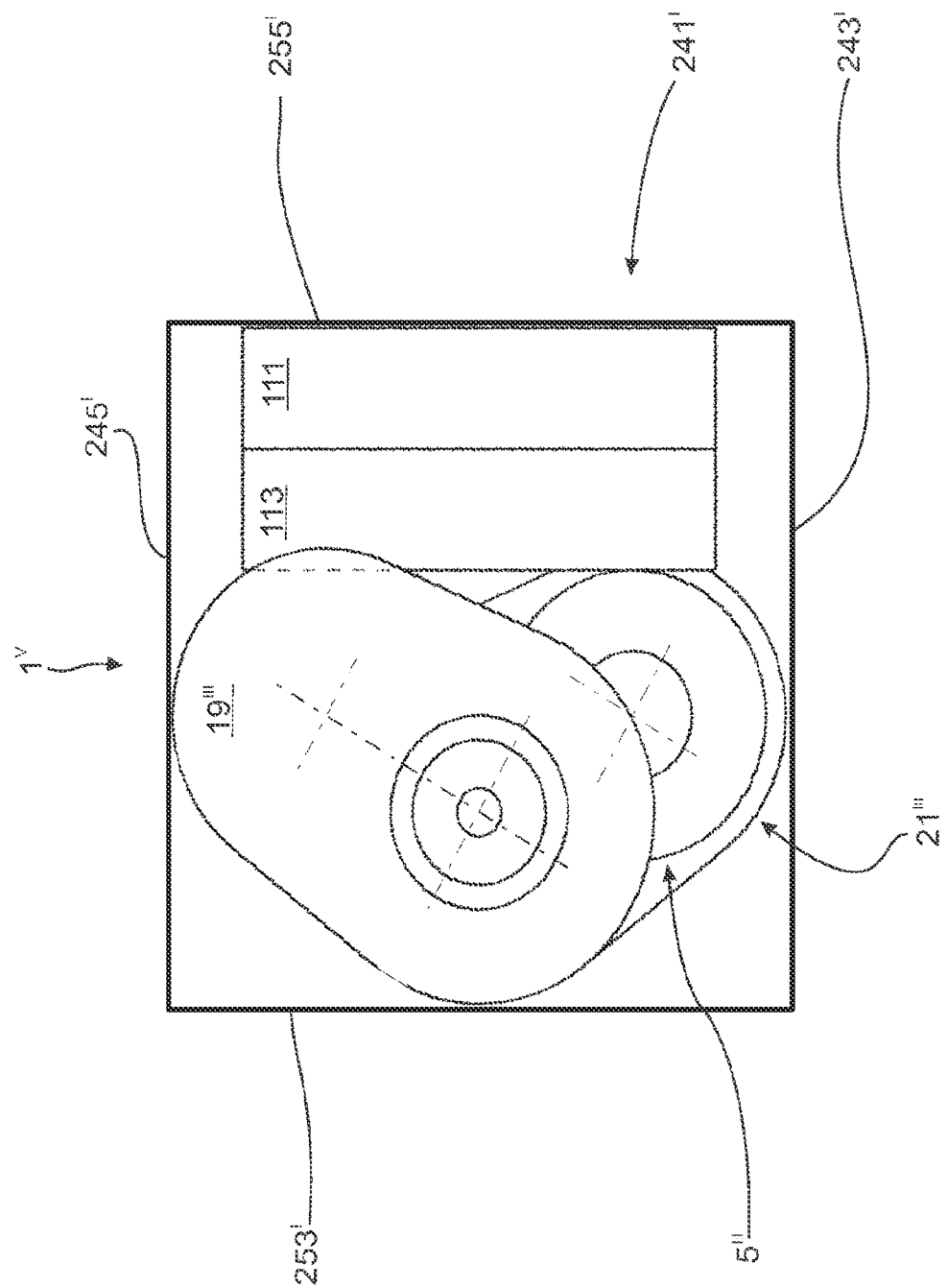
FIG. 9 schematically shows a fifth embodiment of a drive block.
Figure 10:
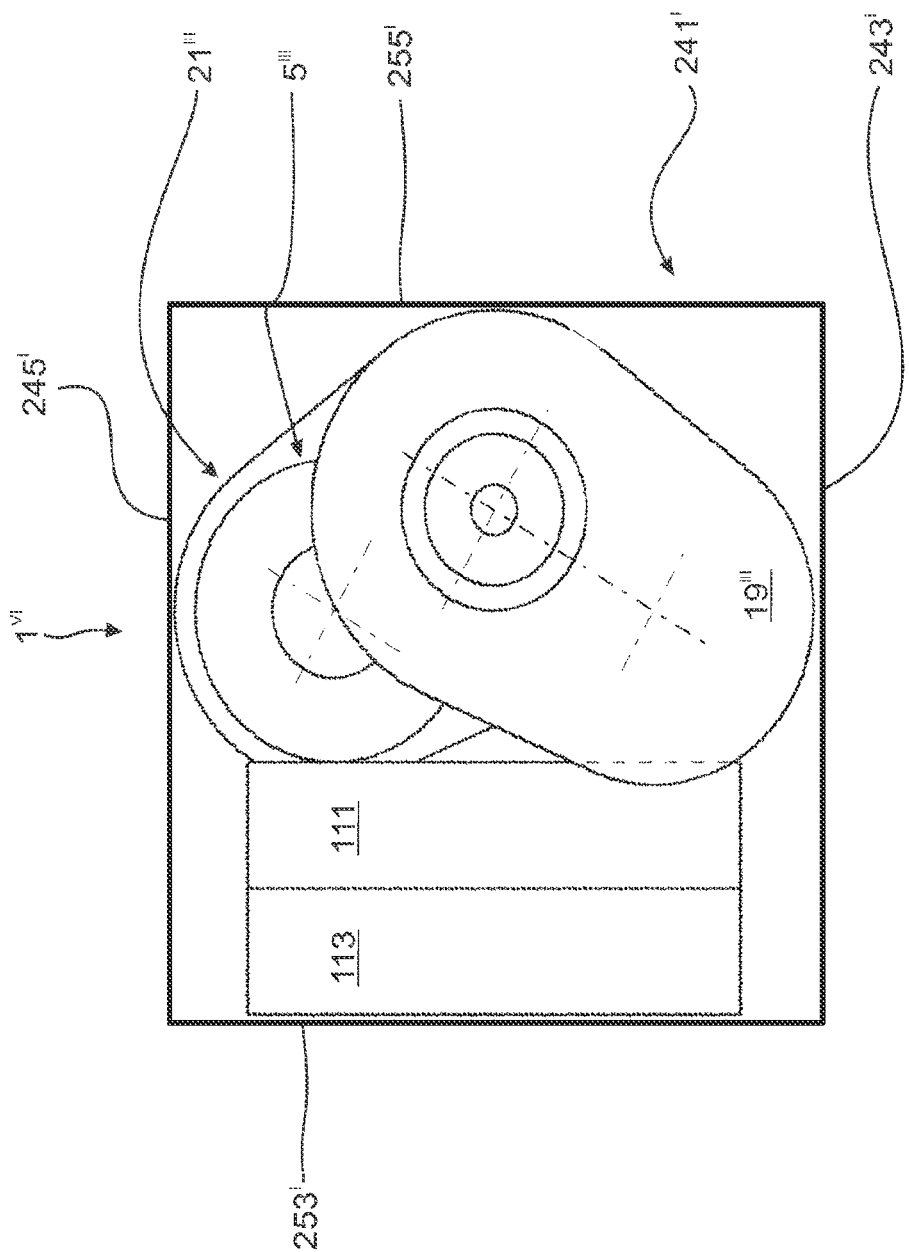
FIG. 10 schematically shows a sixth embodiment of a drive block.

If FIGS. 8 and 9 are compared with each other, the drive block $1^V$ in the diagram shown in FIG. 9 is rotated through 90 degrees in the clockwise direction within the installation space boundary $241^I$. FIG. 10 shows the drive block $1^{VI}$, which compared to the diagram in FIG. 8 has been rotated through 90 degrees in the counterclockwise direction within the installation space boundary $241^I$. Because the inverters 111, 113 are oriented at the front, these can be cooled particularly efficiently by drafts or by the airflow during travel. In the arrangement shown in FIG. 9, in the event of a frontal impact directed toward the front boundary surface $253^I$, the impact energy is first directed toward the transmissions $19^{III}$, $21^{III}$, which due to their mass are particularly well suited to absorbing the (collision) energy.

Figure 11:
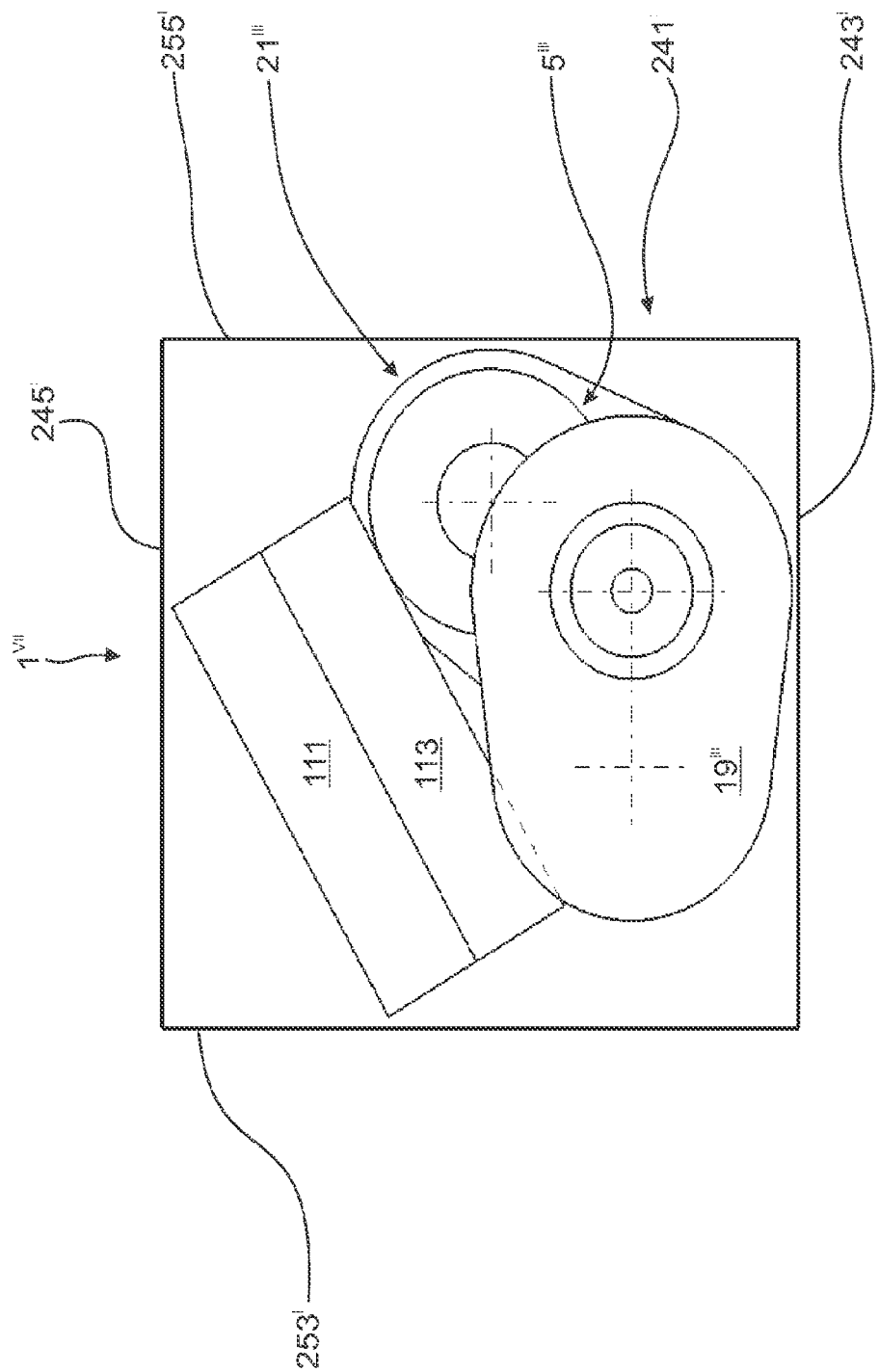
FIG. 11 schematically shows a seventh embodiment of a drive block.

The arrangement of the drive block $1^{VII}$ shown in FIG. 11 is an arrangement that has been rotated through approximately 45 degrees compared to FIG. 8, which offers a good compromise between impact protection and cooling.

Figure 12:
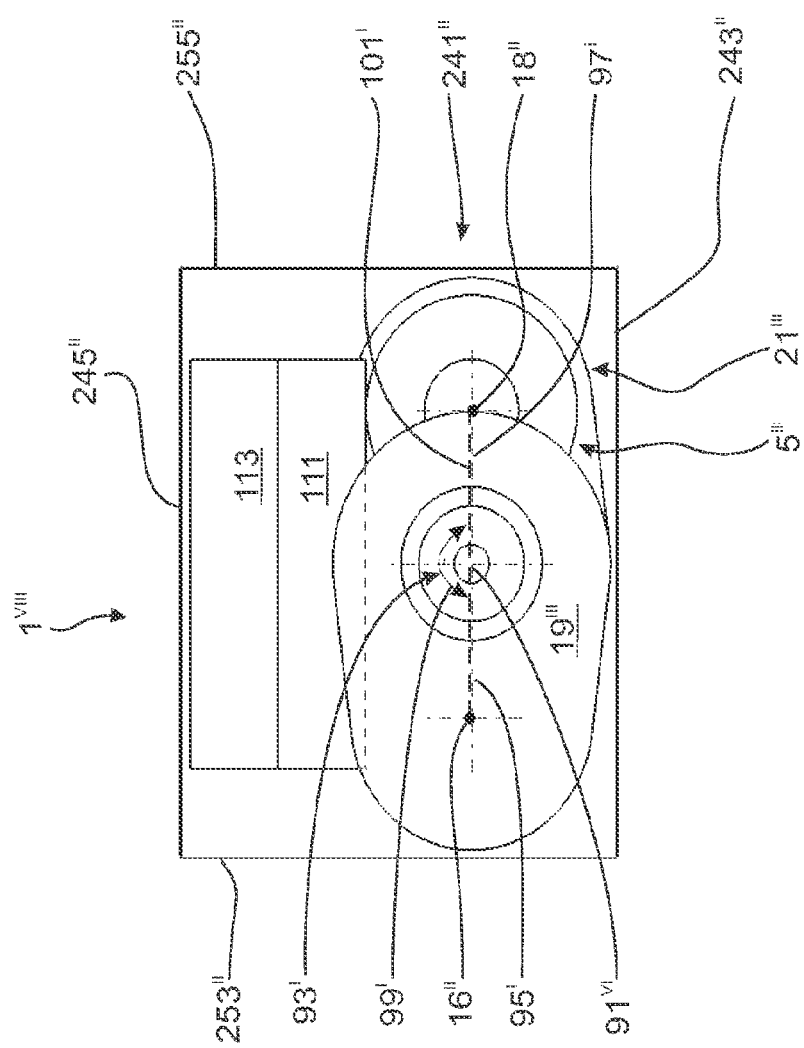
FIG. 12 schematically shows an eighth embodiment of a drive block.

The drive block $1^{VIII}$ shown in FIG. 12 is particularly well suited when a distance between a lower installation space boundary $243^{II}$ and an upper installation space boundary $245^{II}$ is smaller than a distance between a front installation space boundary $253^{II}$ and a rear installation space boundary $255^{II}$. This arrangement, which is extremely space-efficient in relation to one dimension (in the x-extension), is made possible by the fact that the angle $99^I$ between the legs $95^I$, $97^I$ of the V-shaped arrangement $93'$ is selected to be only slightly smaller than 180 degrees, e.g., in the region of 179 degrees. The output shaft $91^{VI}$ is thus located close to the structural plane $101^I$ spanned by the rotary shafts $16^{II}$, $18^{II}$. The installation space boundary $241^{II}$ encloses a narrow, elongated area which is (particularly) low in height (an installation space that is wider than it is high).

Figure 13:
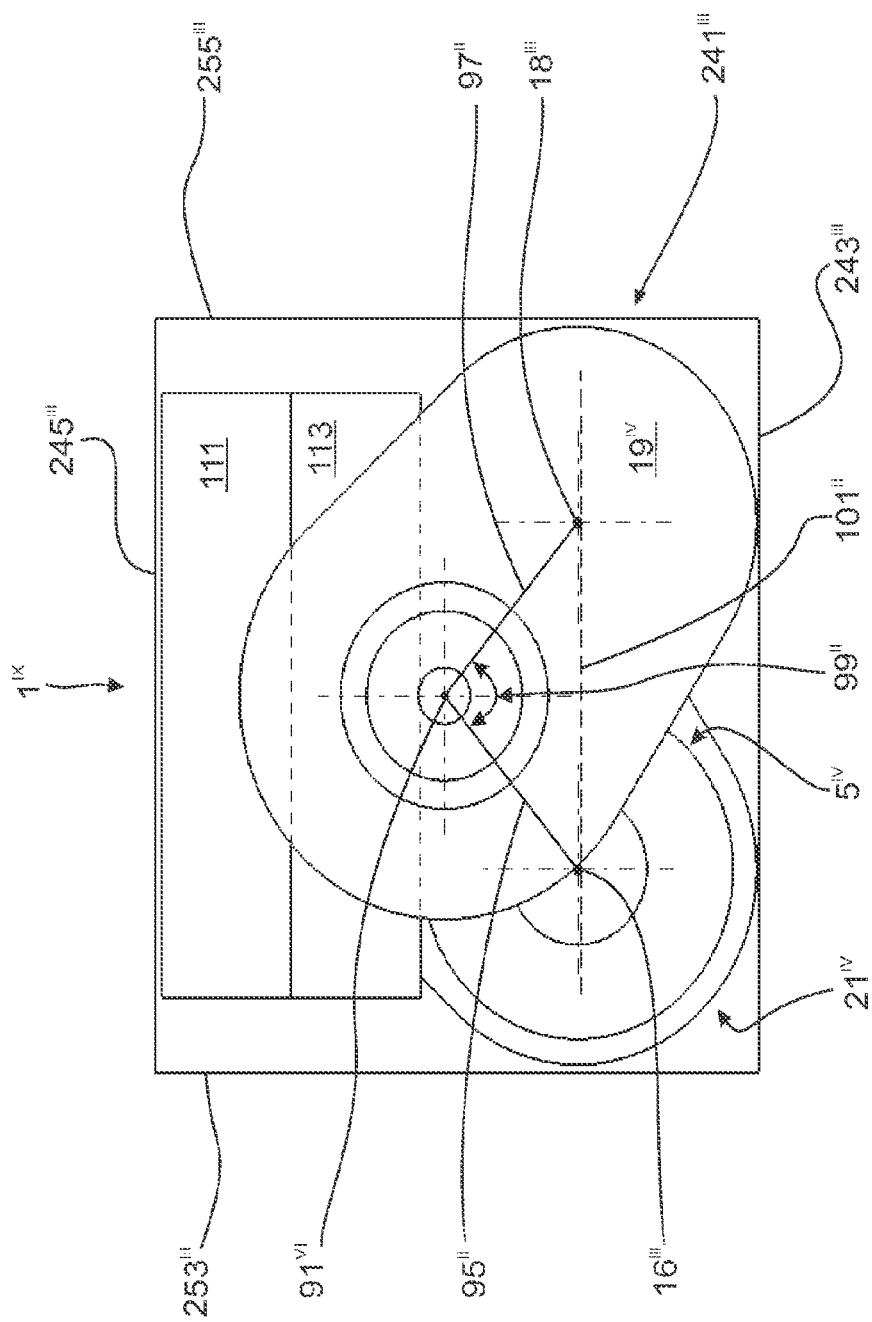
FIG. 13 schematically shows a ninth embodiment of a drive block.
Figure 14:
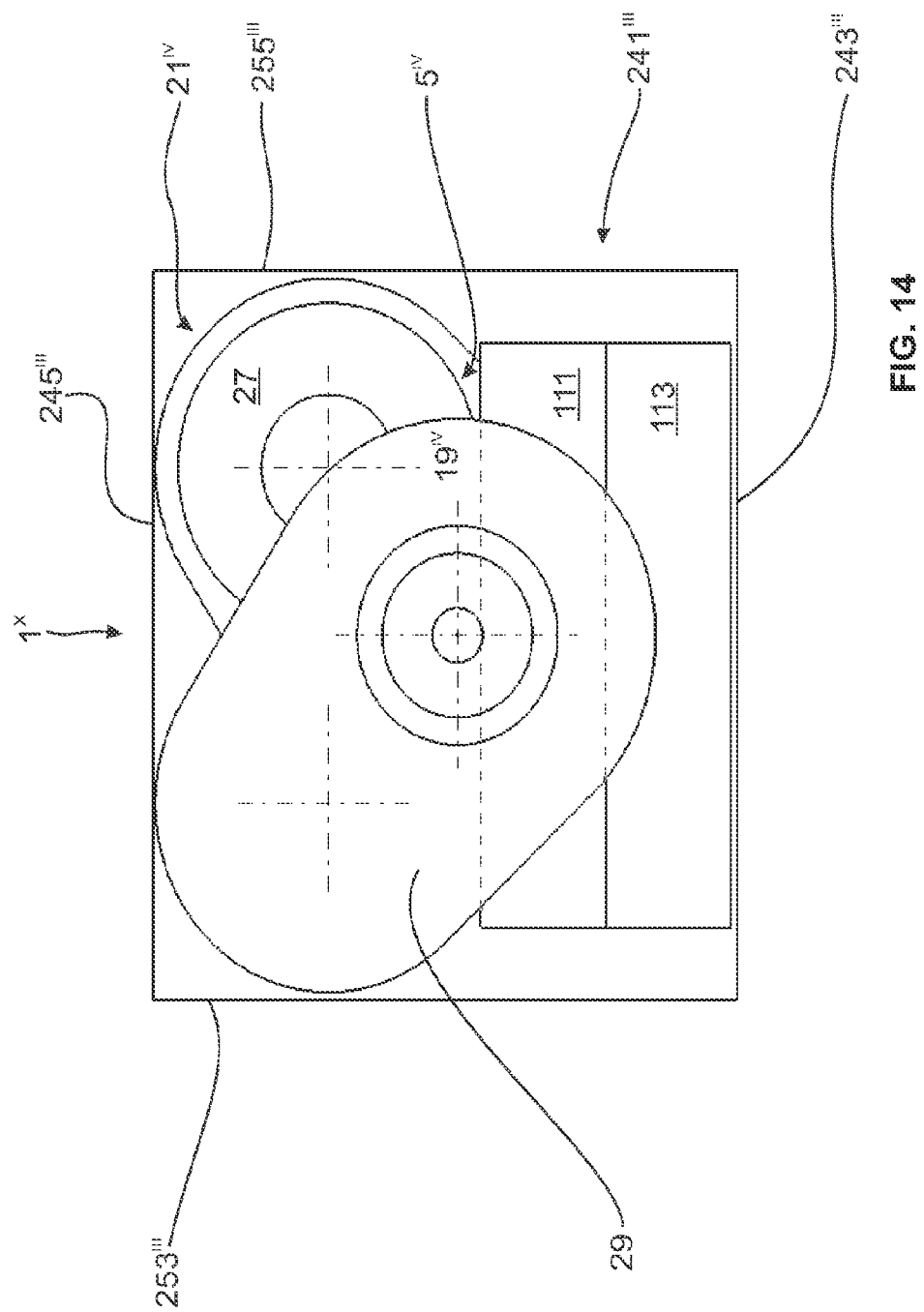
FIG. 14 schematically shows a tenth embodiment of a drive block.
Figure 15:
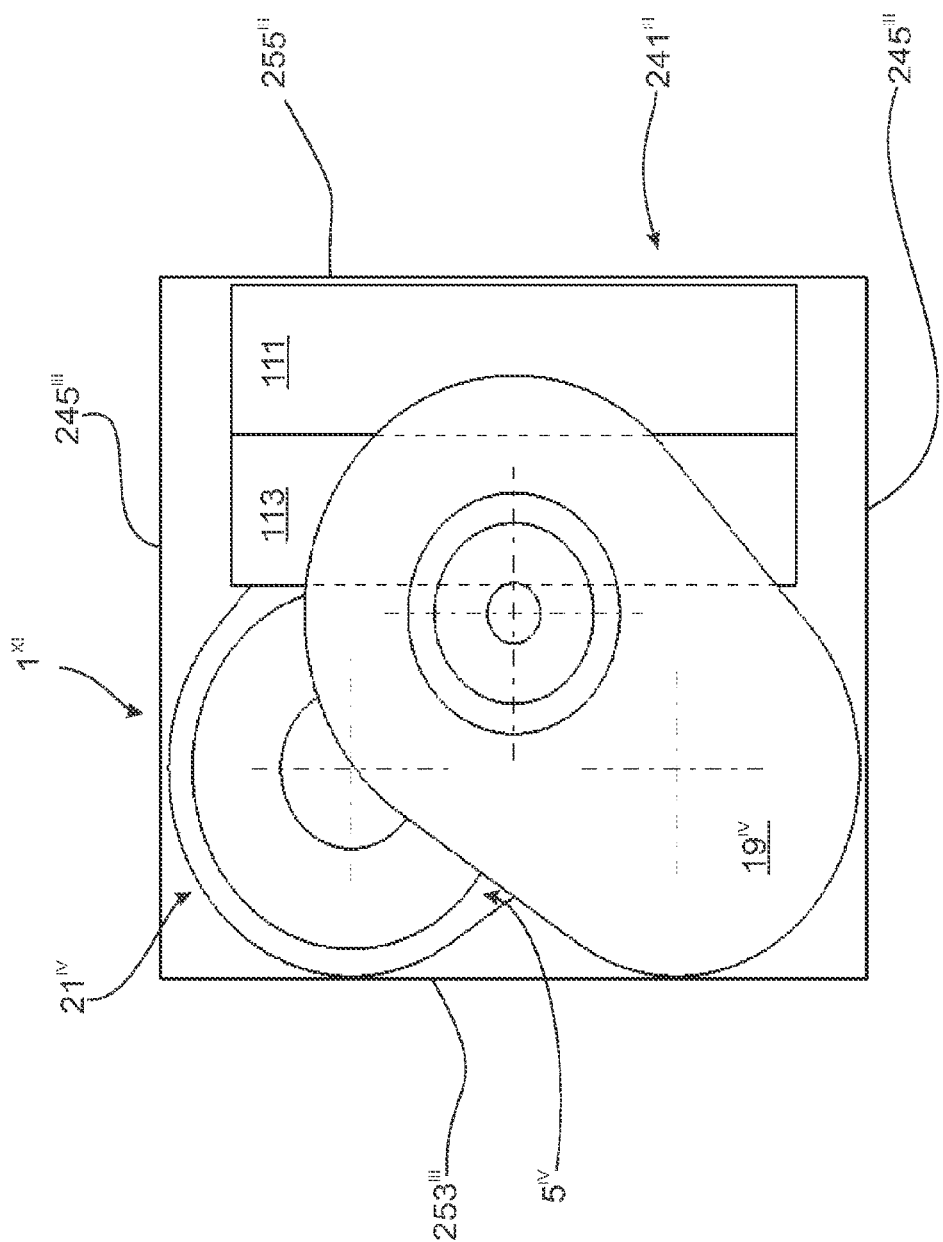
FIG. 15 schematically shows an eleventh embodiment of a drive block.
Figure 16:
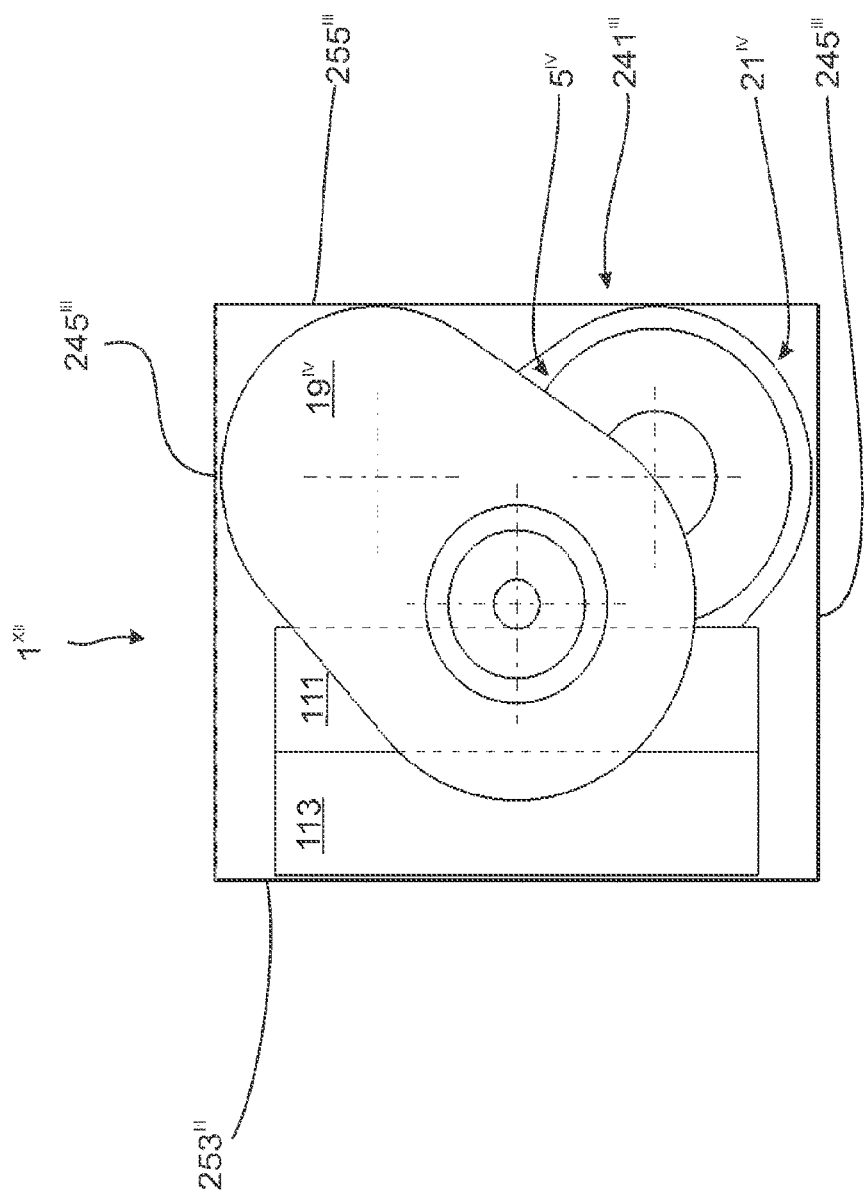
FIG. 16 schematically shows a twelfth embodiment of a drive block.

In the arrangements of the drive blocks $1^{IX}$, $1^X$, $1^{XI}$, $1^{XII}$ shown in FIGS. 13, 14, 15 and 16, the angle of the respective V-shaped arrangement opens away from the inverters 111, 113 (cf. FIG. 13 with the indicated angle $99^{II}$ of the V-shaped arrangement $93^{II}$ oriented away from the inverters 111, 113). In this way, compared to the rotary shafts $16^{III}$, $18^{III}$, the output shaft $91^{VI}$ is located closer to the inverters 111, 113. This can also be referred to as a high-lying output shaft arrangement. In an arrangement according to the illustration of the drive block $1^{IX}$ (see FIG. 13), the inverters 111, 113 extend immediately adjacent to and along the upper installation space boundary $245^{III}$. In the arrangement according to the illustration of the drive block $1^X$ (as shown in FIG. 14), the inverters 111, 113 extend parallel to and close to the lower installation space boundary $243^{III}$. For the drive block $1^{XI}$ (see FIG. 15), installation space boundaries $241^{III}$ are defined, in the case of which the upper installation space boundary $245^{III}$ is located at a distance from the lower installation space boundary $243^{III}$ that is greater than the distance between the front installation space boundary $253^{III}$ and the rear installation space boundary $255^{III}$. The inverters 111, 113 extend parallel to and close to the rear installation space boundary $255^{III}$. In FIG. 16, the inverters 111, 113 extend close to the front installation space boundary $253^{III}$.

As can additionally be seen from FIG. 8, a ring gear housing 342 is provided on the side of the second electric machine $5^{III}$ remote from the output side, said ring gear housing being part of the parking lock of the drive block $1^{IV}$.

Figure 17:
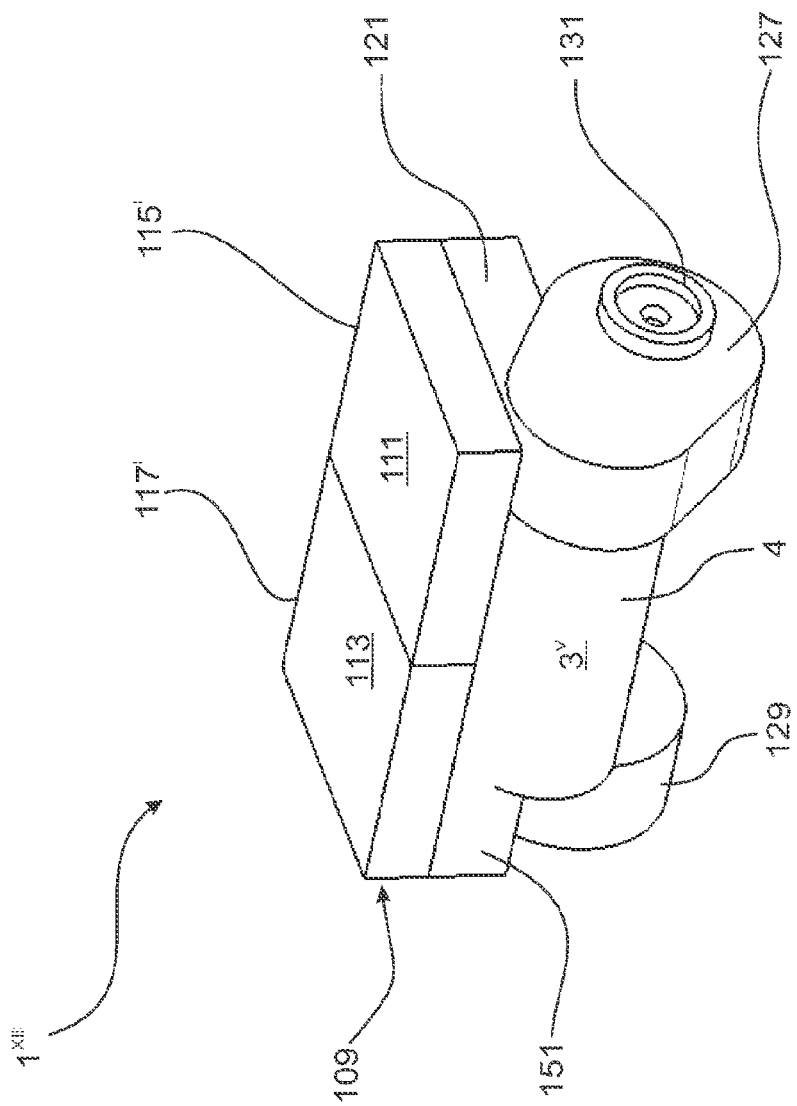
FIG. 17 shows a 3D representation of a drive block, based on the embodiment according to FIG. 8.
Figure 18:
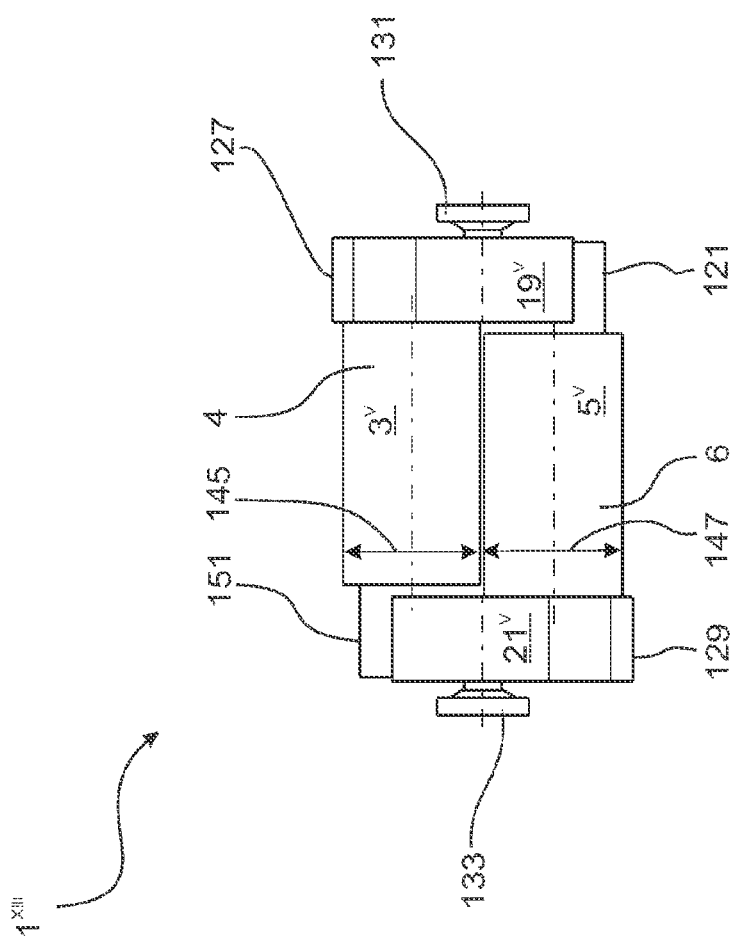
FIG. 18 shows a view of the drive block according to FIG. 17 from below.
Figure 19:
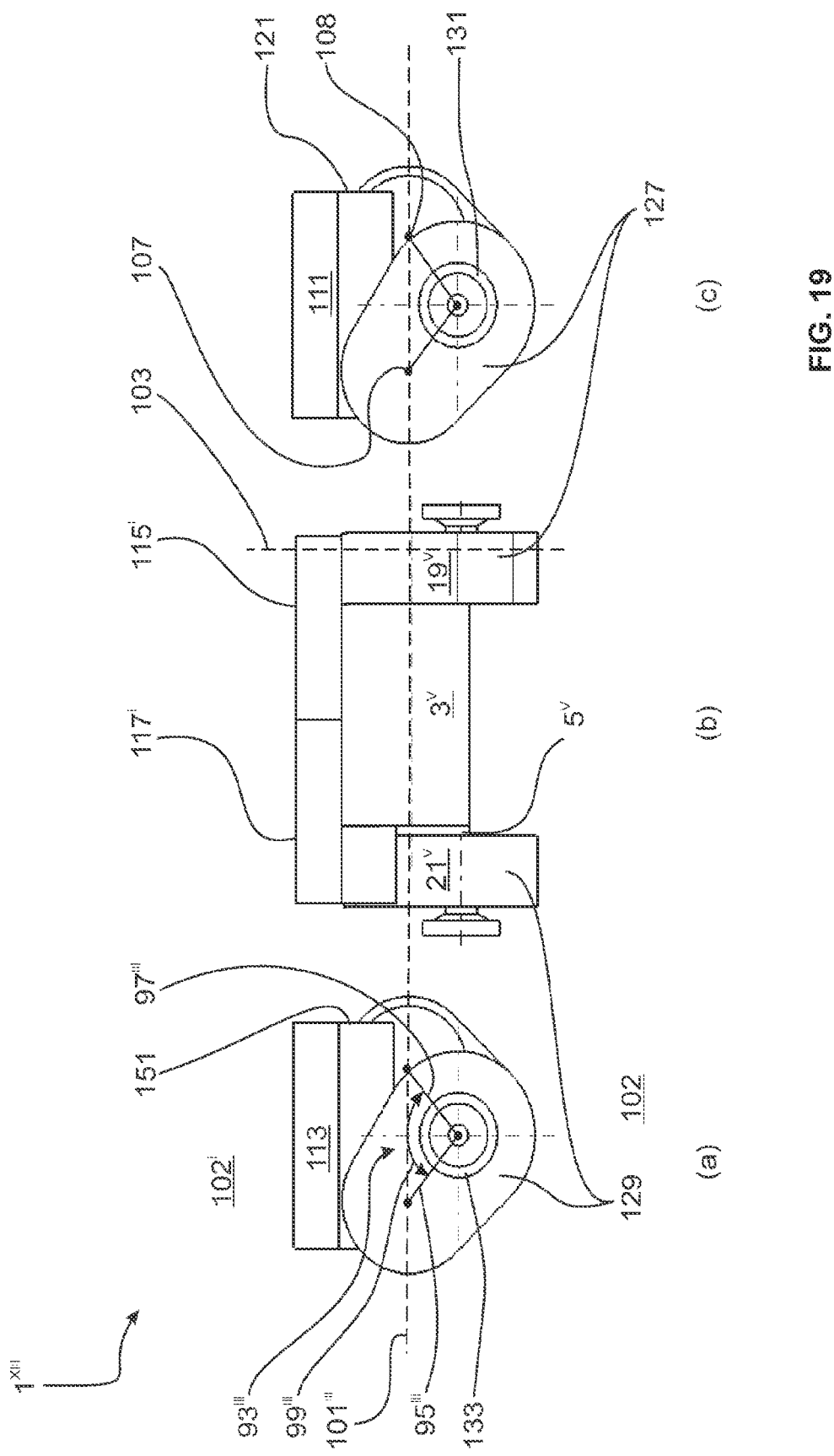
FIG. 19 shows three side views of the drive block according to FIG. 17.

FIGS. 17, 18 and 19 show views of a drive block $1^{XIII}$ or of a block-like drive assembly, with FIG. 17 showing a perspective view. FIG. 18 schematically shows the drive block $1^{XIII}$, or the motor/transmission/inverter assembly thereof according to FIG. 17, from a side that faces toward the ground in the installed position. FIG. 19 shows three side views of the drive block $1^{XIII}$, which are drawn next to each other on a structural plane $101^{III}$ and which, by using the letters (a), (b) and (c), are distinguished as FIG. 19(a), FIG. 19(b) and FIG. 19(c). FIGS. 17 to 19 will be jointly discussed below.

The drive block $1^{XIII}$ has an inverter block 109 with a first inverter 111 and a second inverter 113. An inverter housing $115^I$ of the first inverter 111 and an inverter housing $117^I$ of the second inverter 113 adjoin each other on a narrow side. The inverter housings $115^I$, $117^I$ can also be referred to as inverter sub-housings of the drive block $1^{XIII}$. The inverters 111, 113 are electrically and electronically isolated from each other. The inverter housings $115^I$, $117^I$ are located above the transmission housings, namely a first transmission housing 127 and a second transmission housing 129, which can also be referred to as transmission sub-housings of the drive block $1^{XIII}$. Between the transmission housings 127, 129 and also beneath the inverters 111, 113, two electric machines, a first electric machine $3^V$ and a second electric machine $5^V$, are housed in the electric machine housings 4, 6 (of which only the first electric machine housing 4 of the first electric machine $3^V$ is visible in the view shown in FIG. 17). A parking lock device is also seated beneath the first inverter housing $115^I$ in a housing region 121, which is provided for this purpose and belongs to the transmission housing 127. Located beneath the second inverter housing $117^I$ is a housing region 151, which belongs to the second transmission housing 129. A device for drive switching or axle switching is accommodated in the housing region 151. Drive switching enables a torque from either the first electric machine $3^V$ or the second electric machine $5^V$, or jointly from both electric machines $3^V$, $5^V$, to be directed onto the output shafts, such as the first output shaft 131, more precisely via the flange thereof, depending on the switching state. Drive switching also enables idling largely free of drag torque. It can be seen particularly clearly in FIG. 18 how, in the case of the drive block $1^{XIII}$, the configurations of the first electric machine $3^V$ with its first electric machine width 145 and with the first transmission $19^V$, wherein the transmission $19^V$ is located in the first sub-housing 127, and of the second electric machine $5^V$ with its second electric machine width 147 and with the second transmission $21^V$, which is located in the second sub-housing 129, are in the form of two "L"-shaped assemblies and thus fit together well. The respective drive group consisting of electric machine $3^V$ or $5^V$ and transmission $19^V$ or $21^V$ forms a drive combination for the first output shaft 131 or the second output shaft 133, respectively. It is also clear from the view from below shown in FIG. 18 that the receiving regions 121, 151 of the housing are located on a side of the drive block $1^{XIII}$ remote from the ground and in a region between the inverters 111, 113 and the output shafts 131, 133. The inverters 111, 113 are obscured in the view shown in FIG. 18.

The perspective view that can be seen in FIG. 17 can be comprehended even better when considered together with the three side views in FIG. 19 (a), (b) and (c). In the selected diagram of FIG. 19, all three views (a), (b) and (c) are aligned on a common structural plane $101^{III}$. The structural plane $101^{III}$ separates an area below the plane 102 from an area $102^I$ above the plane. Above the structural plane $101^{III}$, the two inverters 111, 113 are arranged next to each other in their respective housings $115^I$, $117^I$. The first electric machine $3^V$ and the second electric machine $5^V$ are on both sides of the structural plane $101^{III}$. It should again be recalled that the position of the rotor shafts of the electric machines $3^V$, $5^V$ are the reference axes for the position of the structural plane $101^{III}$ (cf. FIG. 8). The first output shaft 131, which leads out from the first transmission housing part 127 of the first transmission $19^V$ (see plan view in FIG. 19, view (c)), extends below the structural plane $101^{III}$, as does the second output shaft 133 that belongs to the second transmission $21^V$ (see plan view in FIG. 19, view (a)). A design aid line in the form of a first arm $95^{III}$ and a second arm $97^{III}$, which forms a V-shaped arrangement $93^{III}$, is drawn from the respective centers of rotation of the output shafts 131, 133 to the centers of the respective rotary shafts of the electric machines $3^V$, $5^V$ (see FIG. 19, view (a) and view (c)) (viewed spatially, therefore, the arms $95^{III}$, $97^{III}$ are sections through corresponding sub-planes). The arms $95^{III}$, $97^{III}$ enclose an angle $99^{III}$ with respect to each other. The first output shaft 131 leading out from the first transmission 127 is therefore located exactly opposite the second output shaft 133 leading out from the second transmission housing 129. However, the two output shafts 131, 133 are not permanently connected to each other for conjoint rotation. A plane 103 parallel to the transmissions $19^V$, $21^V$ intersects the structural plane $101^{III}$ at right angles. As can also be seen from FIG. 19, the rotor shafts in FIG. 19, view (a) and FIG.

19, view (c) each occupy the same positions 107, 108; they are thus parallel to each other. The housing parts 121, 151 for the parking lock device, in particular for the controller thereof, and for the drive switching or axle switching are also situated in the upper area $102^I$ above the structural plane $101^{III}$.

Figure 20:
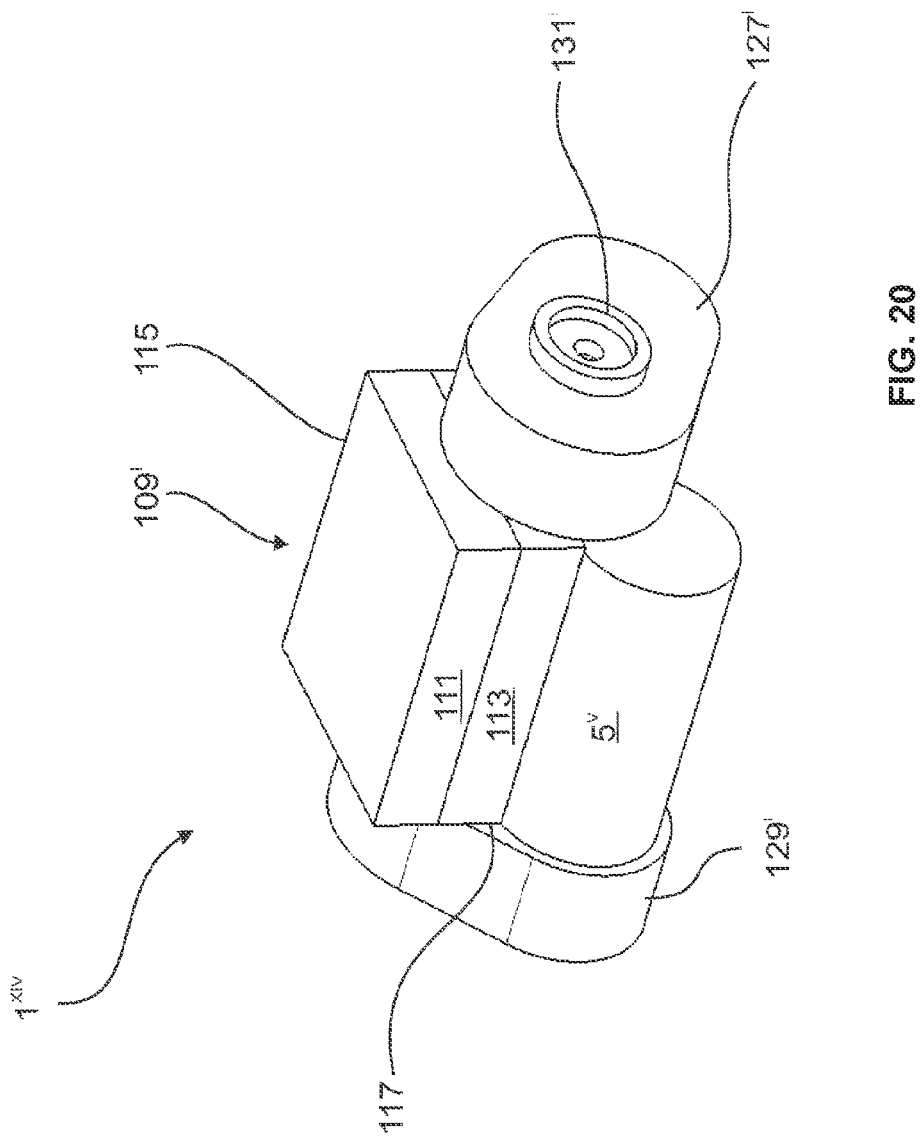
FIG. 20 shows a 3D representation of a drive block, based on the embodiment according to FIG. 13.

FIG. 20 shows another exemplary embodiment of a drive block $1^{XIV}$. With regard to the output shaft $131^I$, $133^I$, the drive block $1^{XIV}$ shown in FIGS. 20 and 21 differs from the diagram in FIG. 17, which shows an output shaft 131, 133 located at the bottom, because in FIGS. 20 and 21 there is an output shaft $131^I$, $133^I$, or more precisely a connection flange, located at the top. A difference in the output shaft arrangement of the two exemplary embodiments, drive block $1^{XIII}$ (FIGS. 17 to 19) and drive block $1^{XXIV}$ (FIGS. 19 and 20), relative to a structural plane $101^{III}$ (in FIG. 19) or $101^{IV}$ (in FIG. 21) can be seen with particular ease if the side views of FIG. 19 (a), (b) and (c) and of FIG. 21 (a), (b) and (c) are viewed side by side.

Figure 21:
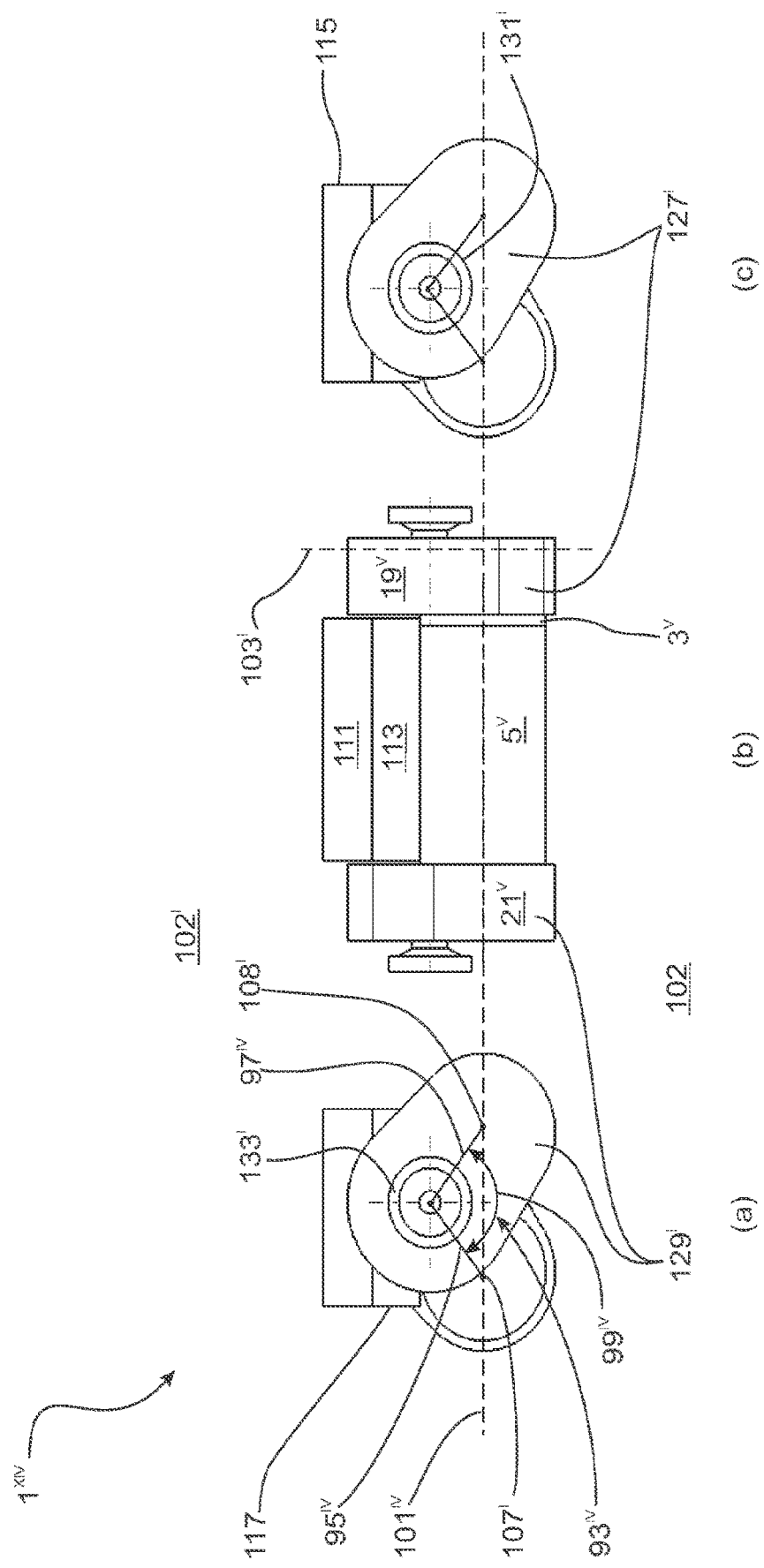
FIG. 21 shows three side views of the drive block according to FIG. 20.

FIGS. 20 and 21 each show different views of a drive block $1^{XIV}$, wherein the first inverter 111 and the second inverter 113 are arranged as a stack above the two electric machines $3^V$, $5^V$. By virtue of their stacked arrangement, the two inverters 111, 113 form the inverter block $109^I$.

It will be conducive to understanding if FIGS. 20 and 21 are discussed jointly.

The first inverter 111 is seated in a first inverter housing 115. The second inverter 113 is seated in a second inverter housing 117. The transmissions $19^V$, $21^V$ driven by the electric machines $3^V$, $5^V$ are accommodated in the transmission housings $127^I$, $129^I$. The second electric machine $5^V$ drives the second transmission $21^V$, which, as can be seen from FIG. 21, is connected to the second output shaft $133^I$ that leads out from the second transmission housing $129^I$. In FIG. 21, the drive block $1^{XIV}$ is shown together with a structural plane $101^{IV}$ in views (a), (b) and (c), wherein the position of the structural plane $101^{IV}$ is defined by the rotor shafts of the electric machines $3^V$, $5^V$. A V-shaped arrangement $93^{IV}$ is selected such that, starting from the positions $107^I$, $108^I$ of the rotor shafts of the electric machines $3^V$, $5^V$, arms $95^{IV}$, $97^{IV}$ extend from the respective centers thereof toward the output shaft $131^I$, $133^I$ (see FIG. 21, view (a) and view (c)). The output shafts $131^I$, $133^I$ are arranged in the area $102^I$, i.e., above the structural plane $101^{IV}$. The two inverter housings 115, 117 are also located in the upper area. An angle $99^{IV}$ between the arms $95^{IV}$, $97^{IV}$ thus opens away from the inverters 111, 113; it is directed downward. The transmission housings $127^I$, $129^I$ protrude into the lower area 102. The drive block $1^{XIV}$ thus enables installation in a motor vehicle even when the installation space available therein above the drive shafts $131^I$, $133^I$ is only small (compared to other exemplary embodiments). A plane $103^I$ which extends parallel to the transmissions $19^V$, $21^V$, and which in particular intersects the output shafts $131^I$, $133^I$ at right angles, is assigned to the transmissions $19^V$, $21^V$ as a further design aid.

In another embodiment, which is based on the drive block $1^{XIV}$ shown in FIGS. 20 and 21, but in which the inverter housings 115, 117 only adjoin each other on a narrow side, a drive block which occupies an even smaller installation space height in a vertical direction can be provided.

Figure 22:
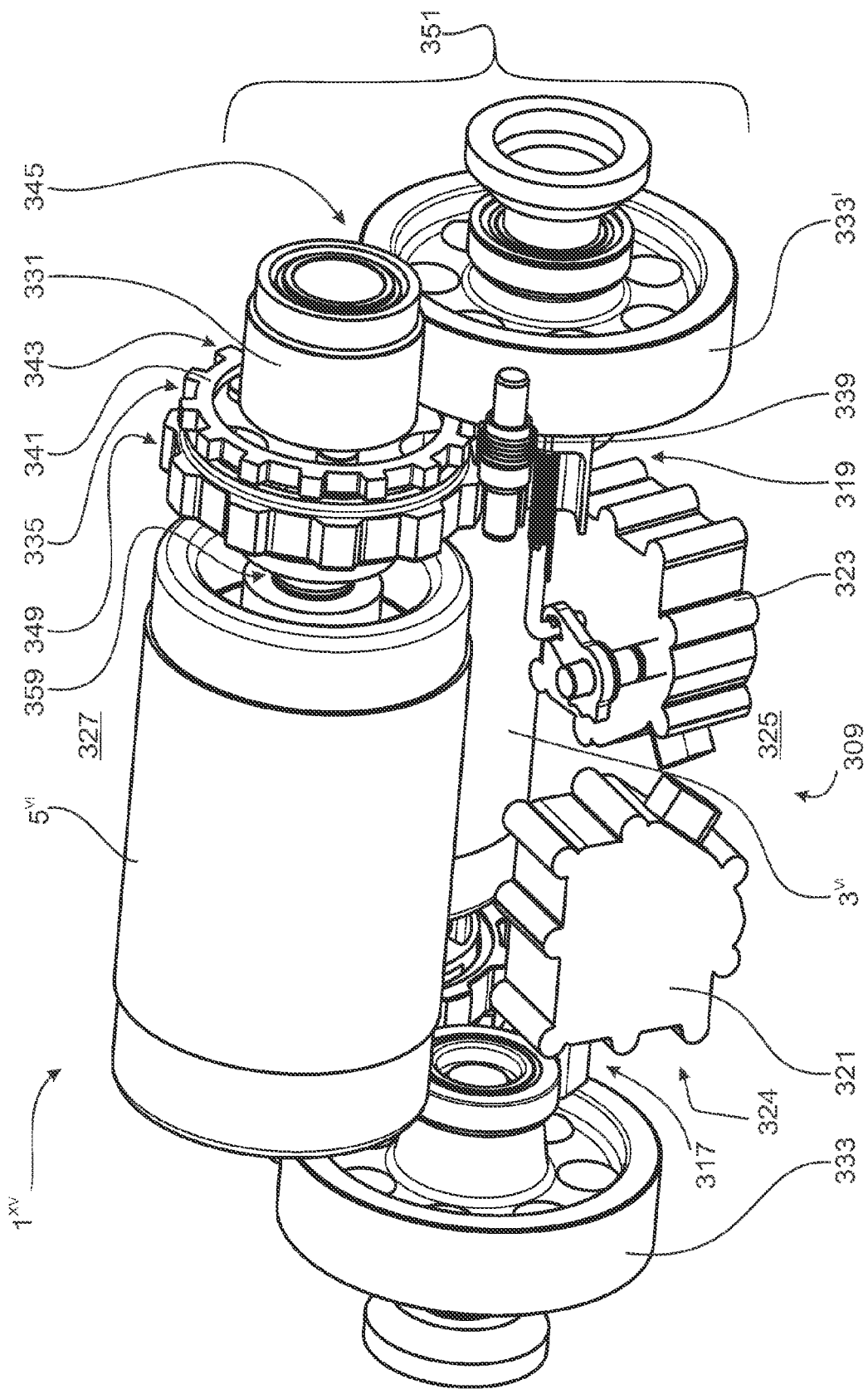
FIG. 22 shows the motors, parking lock actuators and other components of a drive block.

FIG. 22 shows a drive block $1^{XV}$, in which the output has a larger pinion 333, $333^I$ which, as can be seen with reference to the pinion 331, is driven by a smaller pinion, the pinion 331. The two pinions 331, $333^I$ form the transfer stage 345. The small pinion 331 and the large pinion $333^I$ are brought together to form a geared transmission stage 351 (shown in simplified form, i.e., without teeth). A further transfer stage is formed by a planetary transmission stage 349, of which it is possible to see an external toothing of a ring gear for immobilization in the transmission housing 129 (see, for example, FIG. 23). The ring gear (not shown) of the planetary transmission stage 349 is therefore located in the (second) transmission housing 129. Between the planetary transmission stage 349 and the geared transmission stage 351, there is a pawl-type lock 335 with a ring gear 341, on which a toothed outer rim 343 is present. The parking lock 319 is kept in the open state by a spring energy store 339; this is the case for as long as the second parking lock actuator 323 has not yet actuated the parking lock 319. Between the rotor shaft of the electric machine $3^{VI}$, $5^{VI}$ and the planetary transmission stage, such as the planetary transmission stage 349, a spline connection is formed between the two shafts (not visible). The planet carrier of the planetary transmission stage 349 is guided on the pinion 331, which operates as an input pinion of the geared transmission stage 351.

In order to move a vehicle, the electric machine $5^{VI}$, for example, transmits a torque via an input shaft 359 to a pinion 331 and onward via the geared transmission stage 351 to a road wheel (cf. road wheel and axle 209 in FIG. 1) when the parking lock 319 is in an open state. In a locked position of the parking lock, i.e., when the parking lock 319 is in a closed or engaged state, torque transmission is prevented inter alia by a blocking signal, which can be applied—in the manner of a feedback loop—to an electronic parking lock interlock input on the electric machine $5^{VI}$ or to an inverter control unit (not shown).

The two parking lock actuators 321, 323 are part of a parking lock actuation mechanism 324, which is classed as a first type of parking lock device 309. The first type of parking lock actuation mechanism 324 enables individual actuation of a respective parking lock assigned to the parking lock actuator 321, 323, such as the parking lock 319 and the parking lock 317. An actuating force exerted by one of the parking lock actuators 321, 323 undergoes a deflection in the parking lock actuation mechanism 324. An actuating force of the actuator is leveraged and thus amplified via an actuating linkage (not shown).

Figure 23:
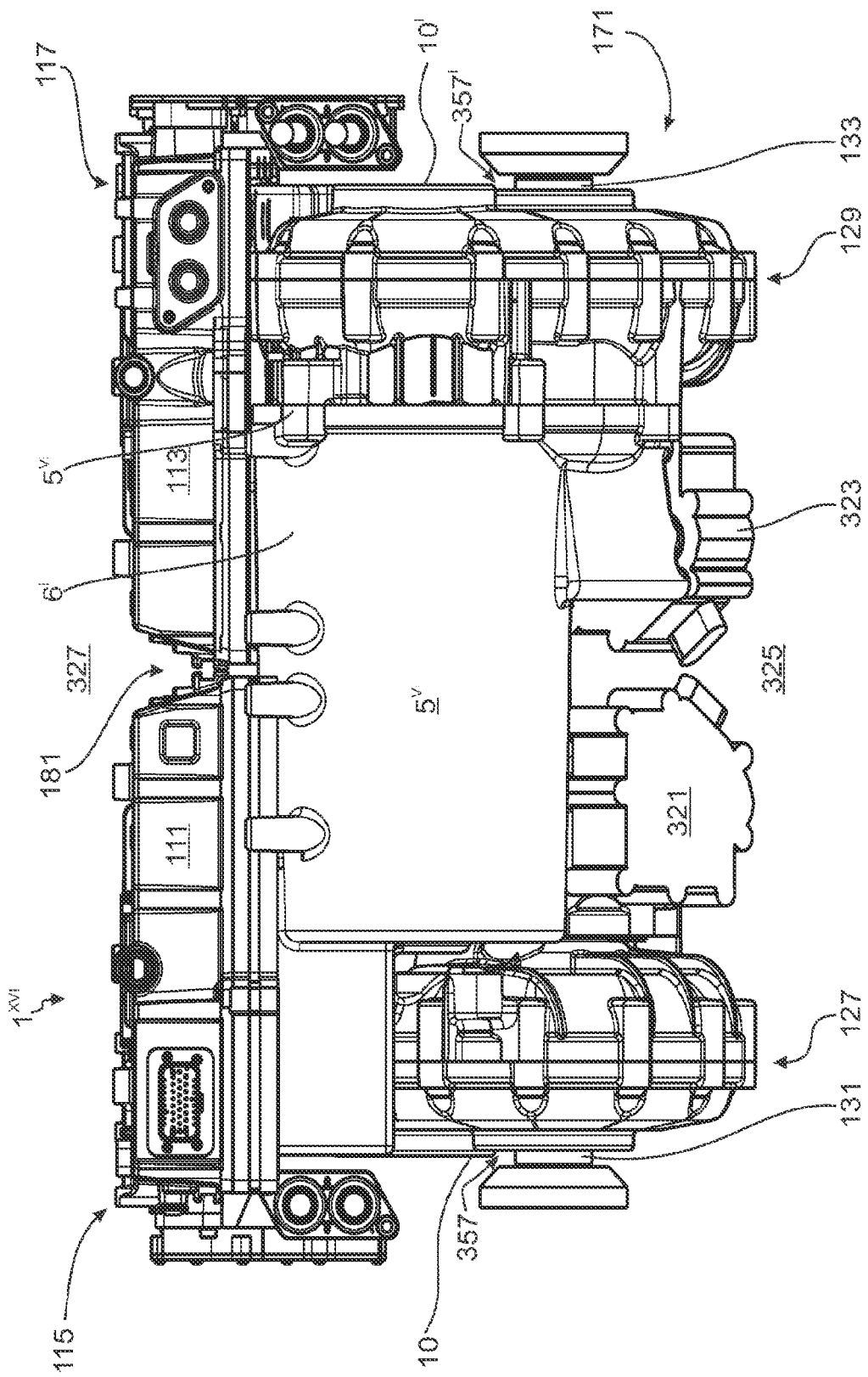
FIG. 23 shows a side view of an embodiment of a drive block according to the invention, provided as an installation assembly.

As can be seen with reference to the drive block $1^{XVI}$ of FIG. 23, the two electric machines, such as the electric machine $5^{VI}$, cover the parking lock actuators 321, 323 placed in the area 325 close to the ground, i.e., the electric machines $5^V$ bound the installation space for the parking lock actuators 321, 323 in the upward direction. In FIG. 23, the two electric machines are situated at the same height, and therefore the second electric machine $5^{VI}$ covers a first electric machine that is present. If FIG. 22 is considered alongside FIG. 23, the second electric machine $5^{VI}$ is situated higher than the first electric machine $3^{VI}$ in the drive block $1^{XV}$. The second electric machine $5^{VI}$ is thus located closer to an area more remote from the ground, i.e., closer to the area 327 remote from the ground, than the first electric machine $3^{VI}$ (cf. the arrangement of drive block $1^{VII}$ according to FIG. 11). FIG. 22 also shows that the parking lock actuators 321, 323 are situated in the area 325 close to the ground.

In other words, FIG. 23 shows the drive block $1^{XVI}$ from a perspective from which it is possible to see a first parking lock actuator 321 and a second parking lock actuator 323, which are situated in the area 325 close to the ground. The parking lock actuators 321, 323 are situated between the two transmission housings 127, 129, from which output shafts 131, 133 protrude. The parking lock actuators 321, 323 are located between the transmissions or the transmission housings 127, 129. Located in each of the transmission housings 127, 129 is an output gear 357, 357$^I$ (not visible in the selected diagram), which connects a spur gear stage of the transmissions (not visible, cf. transmissions 19, 21 in FIG. 5) located in the transmission housings 127, 129 to the output shafts 131, 133. The parking lock actuators 321, 323 can each immobilize one of the output gears 357, 357$^I$ by way of an associated parking lock (not visible in the diagram). In an immobilized state, the output shafts 131, 133 are fixed in position; they can no longer rotate. A motor vehicle (cf. motor vehicle 201 in FIG. 1) immobilized by the parking lock actuators 321, 323 is doubly secured against rolling away.

The inverters 111, 113 are placed in the area 327 remote from the ground.

As can also be seen from FIG. 23, the drive block $1^{XVI}$ includes a first and a second transmission housing 127, 129, a first and a second box-like housing 115, 117 in which respectively a first and a second inverter 111, 113 is arranged, and a first and a second output shaft 131, 133. The electric machine housings, such as the electric machine housing 6$^I$, are located between the transmission housings 127, 129 and below the box-like inverter housings 115, 117. Seated on the drive block $1^{XVI}$ in an area 325 closer to the ground than the electric machine, which is enclosed by the electric machine housing 6$^I$ in a lubricant-tight manner, are the parking lock actuators 321, 323, namely arranged between the transmission housings 127, 129. The box-like inverter housings 115, 117 of the drive block $1^{XVI}$ extend next to each other in an area 327 further away from the ground and are separated from each other by a separation gap 181. Torque is conducted out of the transmission housings 127, 129 by means of output shafts 131, 133$^I$, which are each equipped with a connecting sleeve. Compared to the electric machine in the electric machine housing 6$^I$, the output shafts 131, 133$^I$ are located in an area 325 closer to the ground. The drive block $1^{XVI}$ according to FIG. 23 is shown in its installation position 171, i.e., in the position in which the drive block $1^{XVI}$ is to be installed in a motor vehicle (cf. FIG. 4), namely with the inverters 111, 113 in the area 327 remote from the ground.

In exemplary embodiments according to the invention, it is possible to provide other types of parking locks, in which the parking lock actuation mechanism in the drive block is designed both to immobilize a first output shaft, which is assigned to a first electric machine for transmitting drive power, and to immobilize a second output shaft, which is assigned to a second electric machine for transmitting drive power. One parking lock actuator can thus immobilize one complete axle 209 (cf. FIG. 1). An actuating force or actuating motion exerted by the parking lock actuator is branched or split by means of the parking lock actuation mechanism. A partial actuating force or motion within the parking lock device is diverted to a first and a second parking lock (no reference signs), with the force being converted in particular from a rotational motion of the actuator into a pushing motion in order to bring about a locked state of the parking lock.

In one embodiment variant, the locked state of the parking lock can be achieved by means of a pulling motion.

By virtue of such a parking lock device, such as the parking lock device 309 in FIG. 22, the vehicle 201 or 201' shown (schematically) in FIG. 1 or FIG. 4 can be placed in an "inactive" state or can no longer be moved by wheels rotating on an axle 209 or 209$^{II}$ Of two axles 209, 209$^I$ or 209$^{II}$, 209$^{III}$, at least one of the two axles can thus be immobilized.

Figure 24:
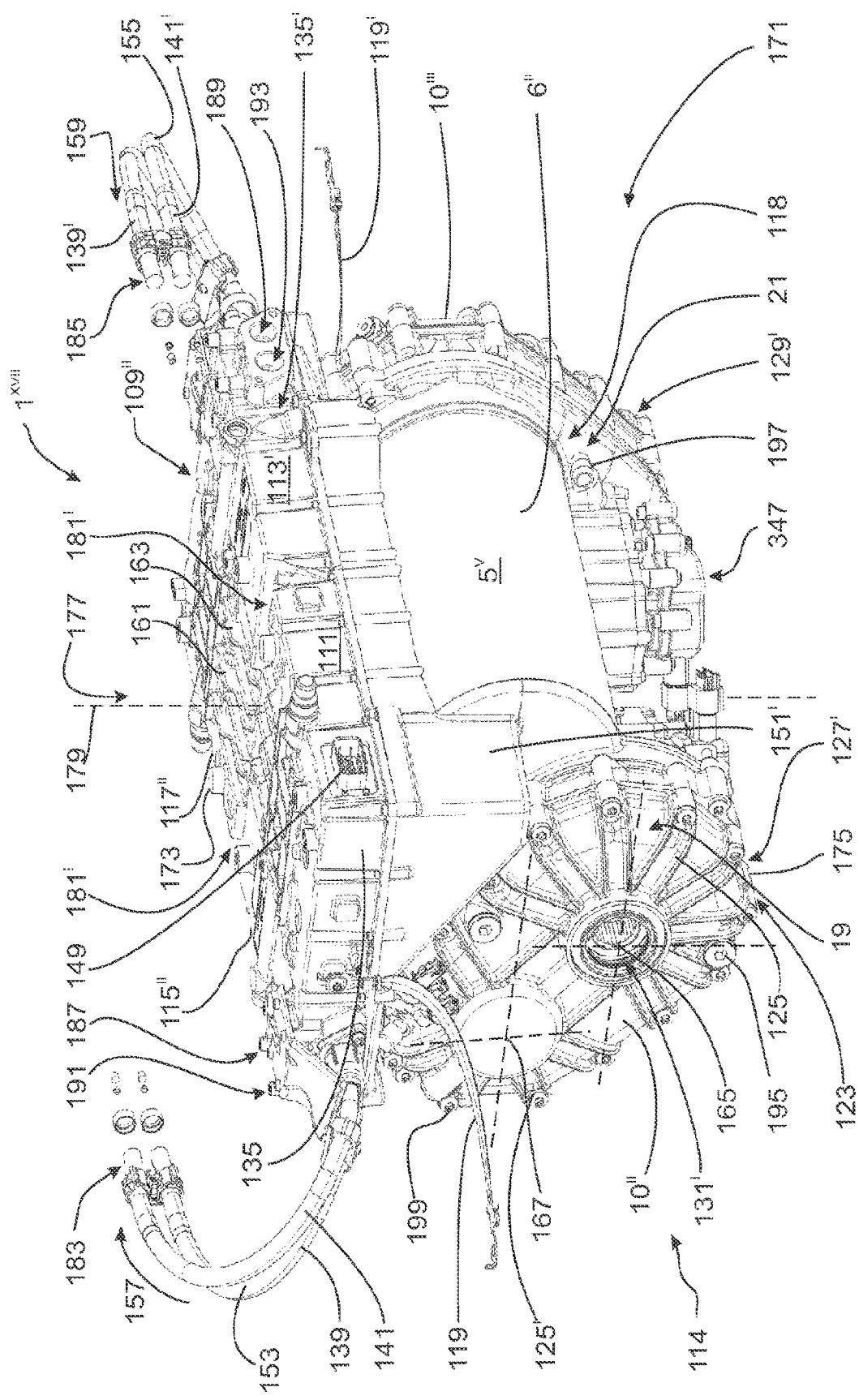
FIG. 24 shows a perspective view of another exemplary embodiment of a drive block according to the invention, provided as an installation assembly.

FIG. 24 shows another embodiment of a drive block $1^{XVIII}$. An inverter block 109$^{II}$ is located on an upper side 177. The inverter block 109$^{II}$ comprises a first inverter 111$^I$ and a second inverter 113$^I$, each covered by a box-like housing 115$^{II}$, 117$^{II}$. In order to cool the inverters 111$^I$, 113$^I$, a first cooling circuit inlet 187 and a first cooling circuit outlet 191 and respectively a second cooling circuit inlet 189 and a second cooling circuit outlet 193 are located on box-like housing lids 115$^{II}$, 117$^{II}$, separately for each inverter 111$^I$, 113$^I$. To aid cooling, the inverter housings 115$^{II}$, 117$^{II}$ each have cooling fins, such as a first cooling fin 161 and a second cooling fin 163. Control connectors, such as the control connector 149, and respectively a first power supply cable 139, 139$^I$ and a second power supply cable 141, 141$^I$ for conducting electrical energy from or to an electrical energy store (cf. energy store 143 in FIG. 4) are located on the two housings 115$^{II}$, 117$^{II}$. The power supply cables 139, 141 to the first inverter 111$^I$ have a greater current path length 153 along their cable routing 157 than the lines 139$^I$, 141$^I$ with their second current path length 155 along a second cable routing 159. Asynchronous drives can thus be weakened by propagation time differences. An electronic isolation and shielding of the inverters 111$^I$, 113$^I$ is improved as a result of the fact that each inverter 111$^I$, 113$^I$ has its own ground connection to a vehicle chassis via a respective ground cable 119, 119$^I$. The connections 149, 119, 119$^I$ for the cables 139, 139$^I$, 141, 141$^I$ are located on narrow sides 135, 135$^I$ of the inverter housings 115$^{II}$, 117$^{II}$. The connection to the electrical energy store (cf. energy store 143 in FIG. 4) takes place by means of electrical connections 183, 185. Located in separate housing regions 151$^I$ below the inverter housings 115$^{II}$, 117$^{II}$ in the drive block $1^{XVIII}$ are a parking lock controller and, in a second electric machine housing 6$^{II}$, a second electric machine 5$^V$. A first electric machine is obscured in the view shown in FIG. 24. Beneath the second electric machine housing 611, the drive block $1^{XVIII}$ comprises a parking lock actuator of a second type of parking lock actuation mechanism 347, which by way of a linkage in the housing interior can immobilize the transmissions arranged on both sides in the transmission housings 127$^I$, 129$^I$. The sub-housings 151$^I$, 6$^{II}$ form part of a core housing 118, which together with the outer housing walls 10$^{II}$, 10$^{III}$ of the transmission housings 127$^I$, 129$^I$ and the inverter housings 115$^{II}$, 117$^{II}$ forms an overall housing 114 of the drive block $1^{XVIII}$. The outer housing wall 10$^{II}$ encloses a first transmission 19 in the transmission housing 127$^I$, and a second outer housing wall 10$^{III}$ encloses a second transmission 21 in a second transmission housing 129$^I$. Along a vertical axis 179 of the housing, the drive block $1^{XVIII}$ has a highest point 173 and a lowest point 175, which must fit into a predefined installation space (cf. installation spaces 239, 239$^I$ in FIG. 1). The drive block $1^{XVIII}$ can be mounted at attachment points, such as the attachment points 195, 197, 199. The outer housing walls 10$^{II}$, 1$^{III}$ have arc-shaped end regions, such as the end region 123, and are equipped with a plurality of reinforcing webs, such as the reinforcing webs 125, 125$^I$, in order to provide counter-bearings for forces that occur in the transmissions 19, 21. A first group of reinforcing webs, such as the reinforcing web 125, leads in a star-shaped manner to a first focus 165, to which a position of the first output shaft 131$^I$ is assigned, as shown on the first outer housing wall 10$^{II}$. A second group of stabilizing webs, such as the stabilizing web 125$^I$, leads to a second focus 167, which is assigned to a rotor shaft (not visible) of a first electric machine. In the same way as on the first outer housing wall $10^{II}$, correspondingly arranged foci are present on the second outer housing wall $10^{III}$. This results in a very compact design of the drive block $1^{XVII}$, which is additionally equipped with numerous safety features.

In its preferred installation position 171, the drive block $1^{XVII}$ is oriented with the inverters $111^I$, $113^I$ at the top.

The cooling fins 161, 163 on the box-like housings $115^{II}$, $117^{II}$ of the inverters $111^I$, $113^I$ of the drive block $1^{XVII}$ can be seen particularly clearly in FIG. 24.

It can also be seen clearly in FIG. 24 that each inverter $111^I$, $113^I$ has its own electrical connection 183, 185, its own cooling circuit inlet 187, 189, its own cooling circuit outlet 191, 193 and its attachment points.

The (second) current path length 155 of the (second) cable routing 159 is defined by the distance between the electrical energy store (see energy store 143 in FIG. 4) and the drive block $1^{XVII}$ (cf. drive block 1 in FIG. 4).

The two box-like housings $115^{II}$, $117^{II}$ of the inverters $111^I$, $113^I$ are at a slight distance from each other, so that a separation gap $181^I$ is formed between the two.

The inverters $111^I$, $113^I$ may be structurally identical. Simply by rotating about a vertical axis 179 of the housing, it is possible to use two inverters $111^I$, $113^I$ which are identical to each other and which both form part of the upper side 177 of the drive block $1^{XVII}$.

The possible embodiments shown in the individual figures can also be combined with each other in any form.

The centrally arranged battery, such as the electrical energy store 143 (see FIG. 4), may also be placed in the vehicle in a manner distributed across multiple locations. This results in even greater differences in the cable lengths of the power supply cables 139, $139^I$, 141, $141^I$.

In some aspects, the techniques described herein relate to a drive block of an electric motor-driven motor vehicle drive, including a first electric machine and a first transmission and a second electric machine and a second transmission, wherein the first transmission is arranged on an end face of the first electric machine, and the second transmission is arranged on an end face of the second electric machine, wherein respective arrangements are at least partially congruent with each other in a longitudinal vehicle direction, wherein centers of rotation of the electric machines define a structural plane through rotary shafts thereof, in relation to which structural plane a transmission output is offset, so that a V-shaped arrangement having an angle smaller than 180 degrees between arms of the V-shaped arrangement is formed from a first position of the first rotary shaft, from a second position of the second rotary shaft and from the transmission output of one of the transmissions, on a plane parallel to the transmission, wherein at least one of an inverter block and a parking lock device is provided, and wherein at least part of at least one of the inverter block and the parking lock device is located to a side of at least one of the two electric machines and between the transmissions.

In some aspects, the techniques described herein relate to a drive block, wherein at least one of the transmissions is housed in an housing and the housing of one of the transmissions projects laterally beyond an electric machine end face at an end of the first electric machine or at an end of the second electric machine.

In some aspects, the techniques described herein relate to a drive block, wherein the housing is a shallow housing which has two circular arc-shaped end regions and which is provided with two foci.

In some aspects, the techniques described herein relate to a drive block, wherein each transmission comprises two transmission stages, one of the two transmission stages is a planetary transmission stage that is arranged upstream of the other of the two transmission stages, wherein the other of the two transmission stages is a spur gear transmission stage arranged in an output direction.

In some aspects, the techniques described herein relate to a drive block, wherein a parking lock for inhibiting at least one rotation is located on a second side of the structural plane.

In some aspects, the techniques described herein relate to a drive block, wherein at least one inverter is arranged in an encapsulating housing.

In some aspects, the techniques described herein relate to a drive block, wherein the transmissions are housed by an housing between respective outer housing walls, which are provided in an axial direction above the structural plane.

The following is a list of reference numbers used in the drawings and this description.

1, $1^I$, $1^{II}$, $1^{III}$, $1^{IV}$, drive block $1^V$, $1^{VI}$, $1^{VII}$, $1^{VIII}$, $1^{IX}$, $1^X$, $1^{XIV}$, $1^{XV}$, $1^{XVI}$, $1^{XVII}$
2, $2^I$ single-wheel drive
3, $3^I$, $3^{II}$, $3^V$, $3^{VI}$ first electric machine
4 first electric machine housing
5, $5^I$, $5^{II}$, $5^{III}$, second electric machine $5^{IV}$, $5^V$, $5^{VI}$
6, $6^I$, $6^{II}$ second electric machine housing
7, $7^I$ first output side, in particular first end face
8, $8^I$ end face of the electric machine
9, $9^I$ second output side, in particular second end face
10, $10^I$, $10^{II}$, outer housing wall, in particular shell of the transmission sub-housing $10^{III}$ arranged in the axial direction
11 first electrical region, in particular first winding region
13 second electrical region, in particular second winding region
14, $14^I$, $14^{II}$, transmission housing, in particular sub-housing for accommodating a $14^{III}$, $14^{IV}$ transmission
15, $15^I$, $15^{II}$ first drive axle
16, $16^I$, $16^{II}$, first drive shaft, in particular a shaft driven by the electric machine, such as a $16^{III}$ first rotary shaft having a center of rotation
17, $17^I$, $17^{II}$ second drive axle
18, $18^I$, $18^{II}$, second drive shaft, in particular a shaft driven by the electric machine, such as $18^{III}$ a second rotary shaft having a center of rotation
19, $19^I$, $19^{II}$, first transmission $19^{III}$, $19^{IV}$, $19^V$
20 first roller bearing arrangement
$20^I$ first roller bearing
21, $21^I$, $21^{II}$, second transmission $21^{III}$, $21^{IV}$, $21^V$
22 second roller bearing arrangement
$22^I$ first roller bearing
$23^I$, $23^{II}$ distance, in particular between the drive axles
25, $25^I$ coverage area or overlap area, in particular of the electric machines
26 coaxial bearing
27, $27^I$ output shaft, in particular wheel drive shaft
$27^{II}$ first output shaft segment
$27^{III}$ second output shaft segment
$27^{IV}$ third output shaft segment
28, $28^I$, $28^{II}$, output shaft roller bearing arrangement $28^{III}$
29, $29^I$ first road wheel, in particular drive wheel
30, $30^I$ driven axle, in particular common axle
31, $31^I$ second road wheel, in particular drive wheel
32 plug-in connection, in particular non-rotatable shaft connection
33, $33^I$ first joint 35, 35$^I$ second joint
37, 37$^I$ third joint
39, 39$^I$ fourth joint
41, 41$^I$ first side shaft
43, 43$^I$ second side shaft
45, 45$^I$ first single-wheel suspension
47, 47$^I$ second single-wheel suspension
49, 49$^I$, 49$^{II}$ first edge reinforcement, in particular left spar
51, 51$^I$, 51$^{II}$ second edge reinforcement, in particular right spar
54 floor plate, in particular splash guard
61 first direction of travel
63 second direction of travel
65, 65$^I$ first stator radius
67, 67$^I$ second stator radius
70, 70$^I$, 70$^{II}$ gear pair, in particular as a drive for the differential
71, 71$^I$, 71$^{II}$ first planetary transmission, in particular first planetary transmission stage
72, 72$^I$, 72$^{II}$ first output gear stage, in particular gear pair
73, 73$^I$, 73$^{II}$ second planetary transmission, in particular second planetary transmission stage
74, 74$^I$, 74$^{II}$ second output gear stage, in particular gear pair
75, 75$^I$, 75$^{II}$ first drive sun gear
77, 77$^I$, 77$^{II}$ second drive sun gear
79, 79$^I$, 79$^{II}$ first carrier
80, 80$^I$, 80$^{II}$ second carrier
81, 81$^I$, 81$^{II}$ first ring gear, in particular internal gear
82, 82$^I$, 82$^{II}$ second ring gear, in particular internal gear
83, 83$^I$, 83$^{II}$ first intermediate shaft
84, 84$^I$, 84$^{II}$ second intermediate shaft
87 differential, in particular cone differential
91, 91$^I$, 91$^{II}$, first output shaft, in particular transmission output, such as a wheel drive shaft 91$^{III}$, 91$^{IV}$, 91$^V$, 91$^{VI}$
93, 93$^I$, 93$^{II}$, V-shaped arrangement 93$^{III}$, 93$^{IV}$
95, 95$^I$, 95$^{II}$, first arm of the V-shaped arrangement 95$^{III}$, 95$^{IV}$
97, 97$^I$, 97$^{II}$, second arm of the V-shaped arrangement 97$^{III}$, 97$^{IV}$
99, 99$^I$, 99$^{II}$, angle of the V-shaped arrangement 99$^{III}$, 99$^{IV}$
101, 101$^I$, 101$^{II}$, structural plane 101$^{III}$, 101$^{IV}$
102 first side, in particular area below
102$^I$ second side, in particular area above
103, 103$^I$ plane parallel to the transmission
107, 107$^I$ first position, in particular position of the first rotor shaft
108, 108$^I$ second position, in particular position of the second rotor shaft
109, 109$^I$, 109$^{II}$ inverter block
111, 111$^I$ first inverter
113, 113$^I$ second inverter
114 overall housing of the drive block
115, 115$^I$, 115$^{II}$ first box-like housing, in particular encapsulating housing of the first inverter, such as a sub-housing of the inverter
117, 117$^I$, 117$^{II}$ second box-like housing, in particular encapsulating housing of the second inverter, such as a sub-housing of the inverter
118 core housing
119, 119$^I$ ground cable
121 housing region for covering a parking lock device, in particular region for accommodating a parking lock controller
123 circular arc-shaped end region
125, 125$^I$ reinforcing web
127, 127$^I$ first transmission housing, in particular sub-housing of the first transmission
129, 129$^I$ second transmission housing, in particular sub-housing of the second transmission
131, 131$^I$ first output shaft
133, 133$^I$ second output shaft
135, 135$^I$ narrow side of inverter
139, 139$^I$ first power supply cable
141, 141$^I$ second power supply cable
143 electrical energy store
145 first width of the first electric machine
147 second width of the second electric machine
149 controller connector
151, 151$^I$ housing region for drive switching, in particular sub-housing
153 first current path length
155 second current path length
157 first cable routing
159 second cable routing
161 first cooling fin
163 second cooling fin
165 first focus
167 second focus
171 installation position
173 highest point
175 lowest point
177 upper side of the drive block
179 vertical axis of housing
181, 181$^I$ separation gap
183 first electrical connection
185 second electrical connection
187 first cooling circuit inlet
189 second cooling circuit inlet
191 first cooling circuit outlet
193 second cooling circuit outlet
195 first attachment point
197 second attachment point
199 third attachment point
201, 201$^I$ motor vehicle
203, 203$^I$ motor vehicle drive
205 first single-wheel drive
207 second single-wheel drive
209 axle
209$^I$ axle
209$^{II}$ axle, in particular motor vehicle axle, implemented with two single-wheel drives
209$^{III}$ axle, in particular motor vehicle axle, on which a steering linkage can be found
211 longitudinal vehicle direction
213 motor vehicle transverse direction
221, 221$^I$ steering wheel
223, 223$^I$ passenger compartment
225, 225$^I$ steering linkage
231, 231$^I$ side-member
233, 233$^I$, 233$^{II}$, cross-member 233$^{III}$
234 triangular wishbone, in particular a front triangular wishbone
235, 235$^I$ front wheel
236 triangular wishbone, in particular a rear triangular wishbone
237, 237$^I$ rear wheel
239, 239$^I$ installation space
241, 241$^I$, 241$^{II}$, installation space boundary, in particular front boundary of the installation space 241$^{III}$, 241$^{IV}$
243, 243$^I$, 243$^{II}$, lower installation space boundary, in particular boundary surface of the 243$^{III}$ installation space 244 lateral boundary surface
245, 245$^I$, 245$^{II}$, upper installation space boundary, in particular boundary surface of the 245$^{III}$ installation space
246 lateral boundary surface
247 hood or front flap
249 rear flap or trunk lid
251 installation space boundary, in particular rear boundary of the installation space
253, 253$^I$, 253$^{II}$, front boundary surface 253$^{III}$
255, 255$^I$, 255$^{II}$, rear boundary surface 255$^{III}$
261 radiator, in particular on a frame for absorbing collision energy
263 boundary of the passenger compartment, in particular separating wall between installation space and passenger compartment
309 parking lock device
317 first parking lock
319 second parking lock
321 first parking lock actuator, in particular of a first type of parking lock actuation mechanism
323 second parking lock actuator, in particular of a first type of parking lock actuation mechanism
324 first type of parking lock actuation mechanism
325 area close to the ground, in particular first side of a structural plane
327 area remote from the ground, in particular second side of a structural plane
331 smaller pinion
333, 333$^I$ larger pinion
335 pawl-type lock
339 spring energy store
341 ring gear, in particular parking lock ring gear
342 ring gear housing
343 toothed outer rim, in particular of the ring gear
345 transfer stage
347 parking lock actuator of a second type of parking lock actuation mechanism
348 second type of parking lock actuation mechanism
349 planetary transmission stage
351 geared transmission stage, in particular spur gear transmission stage
357, 357$^I$ output gear, in particular of a spur gear stage
359 input shaft

The invention claimed is:

1. A drive block of an electric motor-driven motor vehicle drive,
comprising a first electric machine and a first transmission and a second electric machine and a second transmission,
wherein the first transmission is arranged on an end face of the first electric machine, and the second transmission is arranged on an end face of the second electric machine,
wherein respective arrangements are at least partially congruent with each other in a longitudinal vehicle direction,
wherein centers of rotation of the electric machines define a structural plane through rotary shafts thereof,
in relation to which structural plane a transmission output is offset,
so that a V-shaped arrangement having an angle smaller than 180 degrees between arms of the V-shaped arrangement is formed from a first position of the first rotary shaft, from a second position of the second rotary shaft and from the transmission output of one of the transmissions, on a plane parallel to the transmission,
wherein at least one of an inverter block and a parking lock device is provided, and
wherein at least part of at least one of the inverter block and the parking lock device is located to a side of at least one of the electric machines and between the transmissions.

2. The drive block according to claim 1, wherein at least one of the transmissions is housed in an housing and the housing of one of the transmissions projects laterally beyond an electric machine end face at an end of the first electric machine or at an end of the second electric machine.

3. The drive block according to claim 2, wherein the housing is a shallow housing which has two circular arc-shaped end regions and which is provided with two foci.

4. The drive block according to claim 3, wherein the housing has a diameter through one focus of the two foci that is wider than a diameter through another focus of the two foci.

5. The drive block according to claim 1, wherein each transmission comprises two transmission stages, one of the two transmission stages is a planetary transmission stage that is arranged upstream of the other of the two transmission stages, wherein the other of the two transmission stages is a spur gear transmission stage arranged in an output direction.

6. The drive block according to claim 1, wherein for installation in a cuboidal motor vehicle installation space, which is bounded by boundary surfaces arranged at right angles to each other, the inverter block is configured to be oriented parallel to one boundary surface.

7. The drive block according to claim 1, wherein the structural plane separates an area below the structural plane and an area above the structural plane, wherein the inverter block is arranged in the area above the structural plane.

8. The drive block according to claim 1, wherein the inverter block is located on a first side of the structural plane.

9. The drive block according to claim 8, wherein a parking lock for inhibiting at least one rotation is located on a second side of the structural plane.

10. The drive block according to claim 1, wherein the first electric machine has a first electric machine width and the second electric machine has a second electric machine width,
wherein at least one housing of one of the transmissions protrudes beyond the electric machine width of its electric machine in at least one direction.

11. The drive block according to claim 1, wherein the inverter block is formed of up to two inverters.

12. The drive block according to claim 11, wherein at least one inverter is arranged in an encapsulating housing.

13. The drive block according to claim 11, wherein at least one inverter is situated with a narrow side transverse to the rotary shafts, wherein the narrow side is an end side pointing in a motor vehicle transverse direction.

14. The drive block according to claim 1, wherein at least one parking lock laterally terminates the drive block.

15. The drive block according to claim 1, wherein the drive block is configured for an installation position, wherein one of the electric machines is positioned higher than the other of the electric machines, so that the two centers of rotation are arranged at different points in relation to the longitudinal vehicle direction.

16. The drive block according to claim 1, wherein the drive block is configured for common axle transverse installation in a motor vehicle providing two single-wheel drives.

17. The drive block according to claim 11, wherein each inverter is designed to supply electrical energy to one of the electric machines, wherein each inverter is individually electrically conductive connected to one of the electric machines and wherein at least one inverter is arranged in at least one configuration selected from among: the inverter is separate from the electric machines, the inverter is arranged in a block-like manner and the inverter extends on a side of the structural plane remote from a ground.

18. The drive block according to claim 1, wherein the transmissions are housed by an housing between respective outer housing walls, which are provided in an axial direction above the structural plane.

19. The drive block according to claim 5, wherein one of the rotary shafts ends in an area of one focus.

20. The drive block according to claim 5, wherein the transmission output is situated in an area of one focus.

* * * * *